United States Patent [19]

Favrel et al.

[11] Patent Number: 4,546,469

[45] Date of Patent: Oct. 8, 1985

[54] SYSTEM FOR PROCESSING CHANNEL SIGNALLING IN A TIME-DIVISION DIGITAL EXCHANGE

[75] Inventors: Jean-Paul Favrel, Rueil Malmaison; Jean Ouss, Meudon; Jean-Marc Pocheau, Ivry sur Seine, all of France

[73] Assignee: Compagnie Industrielle des Telecommunications Cit-Alcatel, Paris, France

[21] Appl. No.: 558,728

[22] Filed: Dec. 6, 1983

[30] Foreign Application Priority Data

Dec. 6, 1982 [FR] France .................. 82 20407

[51] Int. Cl.[4] ........................... H04J 3/12
[52] U.S. Cl. ............................ 370/77; 370/110.1
[58] Field of Search .................. 370/58, 77, 110.1

[56] References Cited

U.S. PATENT DOCUMENTS 4,339,815 7/1982 Herledan et al. ............ 370/58
4,473,900 9/1984 Belforte et al. ............. 370/58

FOREIGN PATENT DOCUMENTS 0062296 10/1982 European Pat. Off.
0018911 6/1983 European Pat. Off.

OTHER PUBLICATIONS

F. Behague et al., "CCITT No. 7 Dommon Channel Signalling and the E10 and E12 Digital Switching Systems", ISS 81 CIC Montreal (CA) Session 23B, Paper 2, pp. 1 to 8, Sep. 21-25, 1981.

M. Ballard et al., "The E10.S-TSS.5: A Multipurpose Digital Switching System", ISS 81 CIC Montreal (CA) (Session 14A Paper 1, pp. 1 to 9), Sep. 21-25, 1981.

Primary Examiner—Douglas W. Olms
Assistant Examiner—Frank M. Scutch, III
Attorney, Agent, or Firm—Sughrue, Mion, Zinn, Macpeak, and Seas

[57] ABSTRACT

The invention concerns exchanges switching telephone traffic, and in particular digital exchanges which have tie-lines passing therethrough. The exchange comprises control units (UC) and terminal units (UT) which are microprocessor controlled and which are connected to a switching network (RCX) by two-way multiplex links (MU). Some of the terminal units are connected to handle respective PCM junctions. At least one of the terminal units is a mixer and separator unit (UTB) which receives the signalling channels and in particular the signalling channels associated with the tie lines. This mixer and separator unit serves to forward signalling channel information for the tie lines. The terminal units connected to PCM junctions which include tie lines send the tie line signalling to the mixer and separator terminal unit, and also receive said signalling from said mixer and separator unit for onward transmission over a destination PCM junction.

9 Claims, 10 Drawing Figures

SYSTEM FOR PROCESSING CHANNEL SIGNALLING IN A TIME-DIVISION DIGITAL EXCHANGE

The invention relates to a system for processing channel signalling in a time-division exchange. It is particularly applicable to digital telephone exchanges including a mixture of lines which are switched on a demand basis, i.e. call-by-call, and lines which are switched on a tie line basis, i.e. which are connected through the exchange on a semi-permanent basis.

BACKGROUND OF THE INVENTION

In such an exchange, it is usual to connect a given inlet line or circuit to a required outlet line or circuit via the switching network, with signalling being received and emitted under the control of exchange control units. In a time-division exchange, unlike prior art analog exchanges, tie lines cannot simply be strapped through from a given inlet to a given outlet for as long as the line is leased. Thus, in a digital exchange, semi-permanent tie line connections have to be established through the switching network, and the signalling is received in the same manner as is the signalling on lines which are switched on a demand basis. However, instead of being responded to, the signalling on a tie line must simply be forwarded through the switching network so that the telephone exchange appears to be transparent to tie lines, thereby giving the customer complete freedom in the manner in which he chooses to use the signalling channel he has leased.

This method of implementing tie lines has the drawback of using a non-negligible amount of central control resources in an exchange, in particular because providing full transparency is a difficult constraint to satisfy. Consequently, the aim of the present invention is to provide a system which enables signalling on tie lines to be forwarded without intervention by the central control means of an exchange, while still ensuring that signalling on channels which are being operated on a demand basis is still processed by the central control means.

SUMMARY OF THE INVENTION

The present invention provides a system for processing channel signalling in a time-division digital exchange for switching at least some telephone channels including channels switched on a demand basis and tie-line channels connected on a semi-permanent basis, the exchange including: microprocessor control units; a switching network; and microprocessor terminal units; said control units and said terminal units being connected to said switching network via two-way multiplex lines enabling said terminal units to be controlled by said control units and also enabling said terminal units to communicate with one another; said terminal units including digital circuit terminal units serving respective PCM junctions via respective digital circuits and said exchange including at least one mixer and separator means in which information is stored defining tie line cross connections passing through the exchange;

the improvement wherein said system for processing signalling comprises means for serving communications channels both on a demand basis and on a tie line basis, said means being incorporated both in said digital circuit terminal units and in said mixer and separator means and comprising for each of said digital circuits;

a digital terminal to perform transcoding and frame realignment;

a signalling receiver circuit for receiving channel by channel signalling from said PCM junction connected to said digital circuit and for forwarding to said mixer and separator means at least the tie line signalling relating to channels in said PCM junction which are used on a tie line basis; and a signalling and alignment circuit serving firstly to monitor in parallel the alignment of the multiframes coming from the PCM junction connected to said digital circuit and from the mixer and separator means receiving said tie line signalling, and secondly for transmitting said tie line signalling to the PCM junction served by said digital circuit.

Said mixer and separator means are generally constituted by at least one mixer and separator terminal unit which receives the signalling channels associated with the tie line channels coming from the PCM junctions coming from the exchange and which forwards said tie line channel signalling via the switching network to appropriate digital circuit terminal units for retransmission over their respective associated PCM junctions.

BRIEF DESCRIPTION OF THE DRAWINGS

An embodiment of the present invention is described by way of example with reference to the accompanying drawings, in which.

MORE DETAILED DESCRIPTION

Figure 1:
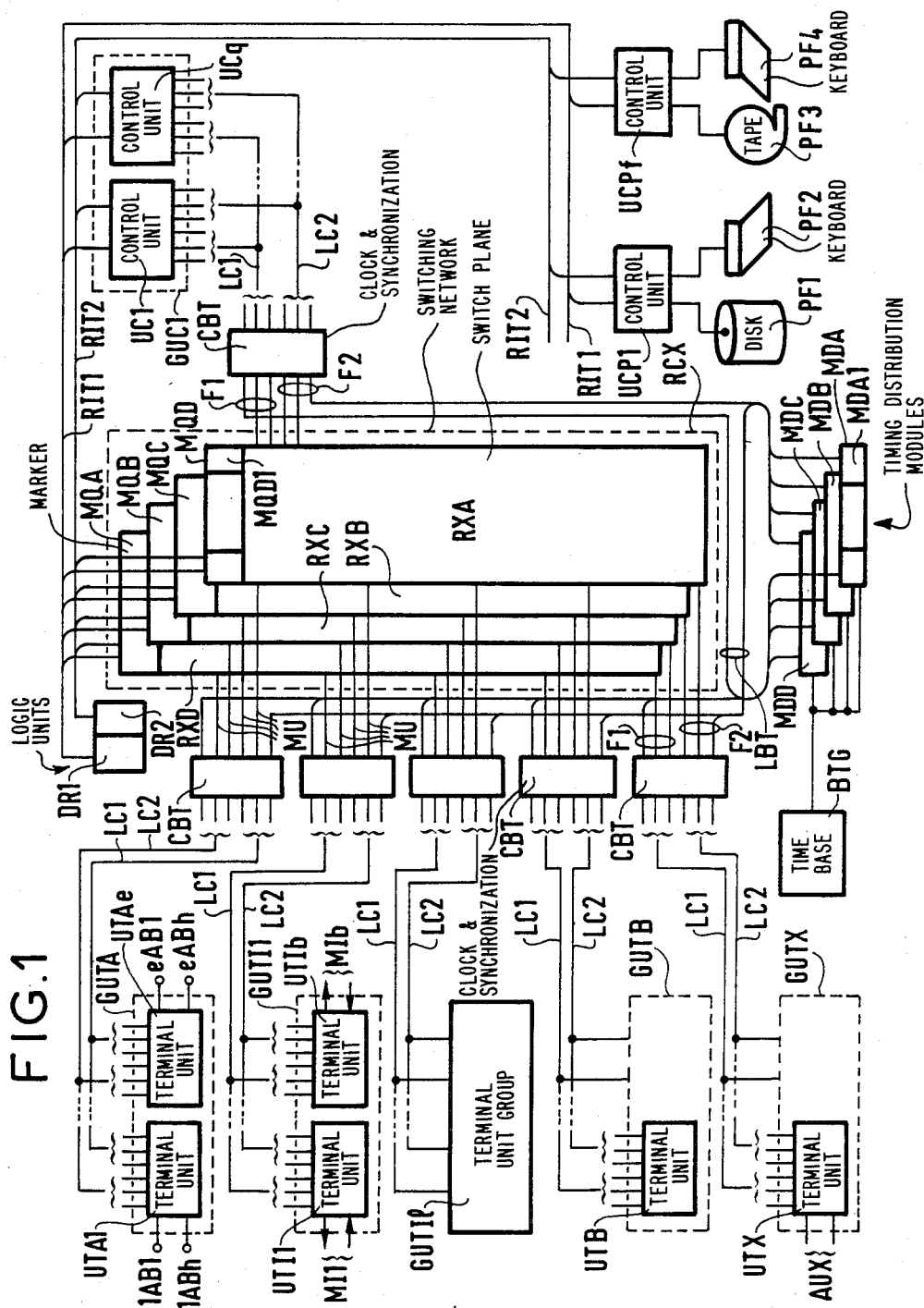
FIG. 1 is a block diagram of an exchange including the present invention.

The time division exchange shown in FIG. 1 comprises a switching network RCX, microprocessor control units UC1 to UCq and UCP1 to UCPf, and terminal units UTA1 to UTX.

The time division switching network RCX is preferably the type described in published French patent application Ser. No. 2 503 514 in the name of CIT-Alcatel and comprises four independent switching planes referenced RXA to RXB, each of which includes a plurality of time switches under the control of a respective marker MQ, e.g. the marker MQD1, with the markers MQ in any one any plane being referred to overall by the references MQA, MQB, MQC or MQD as can be seen in FIG. 1.

The exchange control system is preferably of the type described in published French patent application Ser. No. 2 503 512 in the name of CIT-Alcatel, and comprises a plurality of interchangeable control units UC marshalled into groups GUC each having q control units. Only one group of interchangeable control units GUC1 is shown in in FIG. 1 and it includes control units UC1 to UCq. The exchange control system also includes a group of f control units UCP1 to UCPf for controlling I/O peripherals.

Each control unit UC is essentially constituted by a microprocessor connected via bus links to memory and to I/O interfaces. The peripheral control units UCP are of substantially the same structure as the interchangeable control units UC, but they are not interchangeable in that each of them includes specialised couplers (not shown) for specific peripheral devices, for example, the peripheral control unit UCP1 includes a coupler for a disk drive PF1 and a coupler for a user terminal PF2, while the peripheral control unit UCPf includes a coupler for a magnetic tape drive PF3 and for an operator terminal PF4.

A duplicated network of point-to-point links RIT comprising a first network RIT1 and a second network RIT2 is controlled by a duplicated logic unit DR1, DR2 and provides point-to-point links between the control units UC, the peripheral control units UCP and the markers MQ enabling said devices to interchange information.

A general time base BTG provides clock signals and synchronisation signals required for exchange operation. It may, for example, be of the type described in CIT-Alcatel's published French patent application Ser. No. 2 390 856 which includes three oscillators (not shown) providing the clock signals the synchronisation signals in the form of three pairs of clock and synchronisation signals.

The general time base BTG feeds the control units UC and the terminal units UT with clock signals and synchronisation signals via timing distribution modules MD and clock and synchronisation circuits CBT.

The clock distribution modules MD are independent from one another and they share the distribution of clock and synchronisation signals to the control units UC and to the terminal units UT. To this end, they include a logic circuit (not shown here) which enables each of them to select its pair of signals (i.e. one clock signal and one synchronisation signal) from the three different pairs of signals provided by the general time base BTG. In a preferred implementation, each distribution module MD, e.g. MDA1, is associated with one of the planes of the switching network, and is supervised by the marker MQ controlling said plane, the clock distribution modules associated with each plane are referenced MDA, MDB, MDC and MDD.

Each clock and synchronisation circuit CBT receives clock signals and synchronisation signals from two modules MD, via time base links having an overall reference LBT, and serve to make these clock signals available to the control units UC of a given group GUC or to the terminal units UT of a given group GUT. As can be seen in FIG. 1, the terminal units UT are grouped in a manner similar to the control units UC, with each group of terminal units being referenced GUT and including one or more terminal units. Each clock and synchronisation circuit CBT is inserted for synchronisation purposes in multiplex links having an overall reference MU and serving to connect the terminal units of each group GUT or the control units of each group GUC to the switching network RCX, said multiplex links serving for the interchange of messages between units, and each group GUC and GUT being connected to each plane RX of the switching network by a different multiplex link MU. Each multiplex link MU is a two-way link and may, for example, comprise thirty-two eight-bit channels to enable a data rate of 2 megabits per second in each transmission direction.

Preferably, the multiplex links MU and the time base links LBT serving a given group GUC or GUT are combined in two identically made up bundles bearing overall references F1 and F2 upstream from the clock and synchronisation circuits CBT serving the group, and in two further bundles LC1 and LC2 downstream from the clock and synchronisation circuit. Each unit in the relevant group is connected to each of the bundles LC1 and LC2, each of which therefore includes two multiplex links MU and one time base link LBT since said bundles LC are continuations of respective bundles F1 and F2.

The terminal units UT are conventionally intended to serve different terminals, and in particular FIG. 1 shows:

a group GUTA of e subscriber terminal units UTA1 to UTAE each being connected to h subscriber terminals AB;

a plurality of groups GUTI1 to GUTIl of digital circuit terminal units, each group comprising b terminal units UTI1 to UTIb, where b may be chosen to be equal to four, for example, in the present application, with each digital circuit terminal unit serving a respective thirty-two channel two-way PCM time divided junction referenced MI, e.g. MT1;

a group GUTB of mixer and separator terminal units including at least one mixer and separator terminal unit UTP which is described in greater detail below; and a group GUTX of auxiliary terminal units comprising a plurality of auxiliary terminal units UTX each serving a plurality of auxiliary terminals AUX which provide specific auxiliary functions such as multifrequency signalling, tone generation, recorded announcement generation, conference circuits etc.

Data interchanges between the terminal units UT and the control units UC are performed by means of semaphore procedure messages, e.g. of the HDLC type, which are conveyed over the multiplex links MU via time slots which are switched over the switching network RCX.

Figure 2:
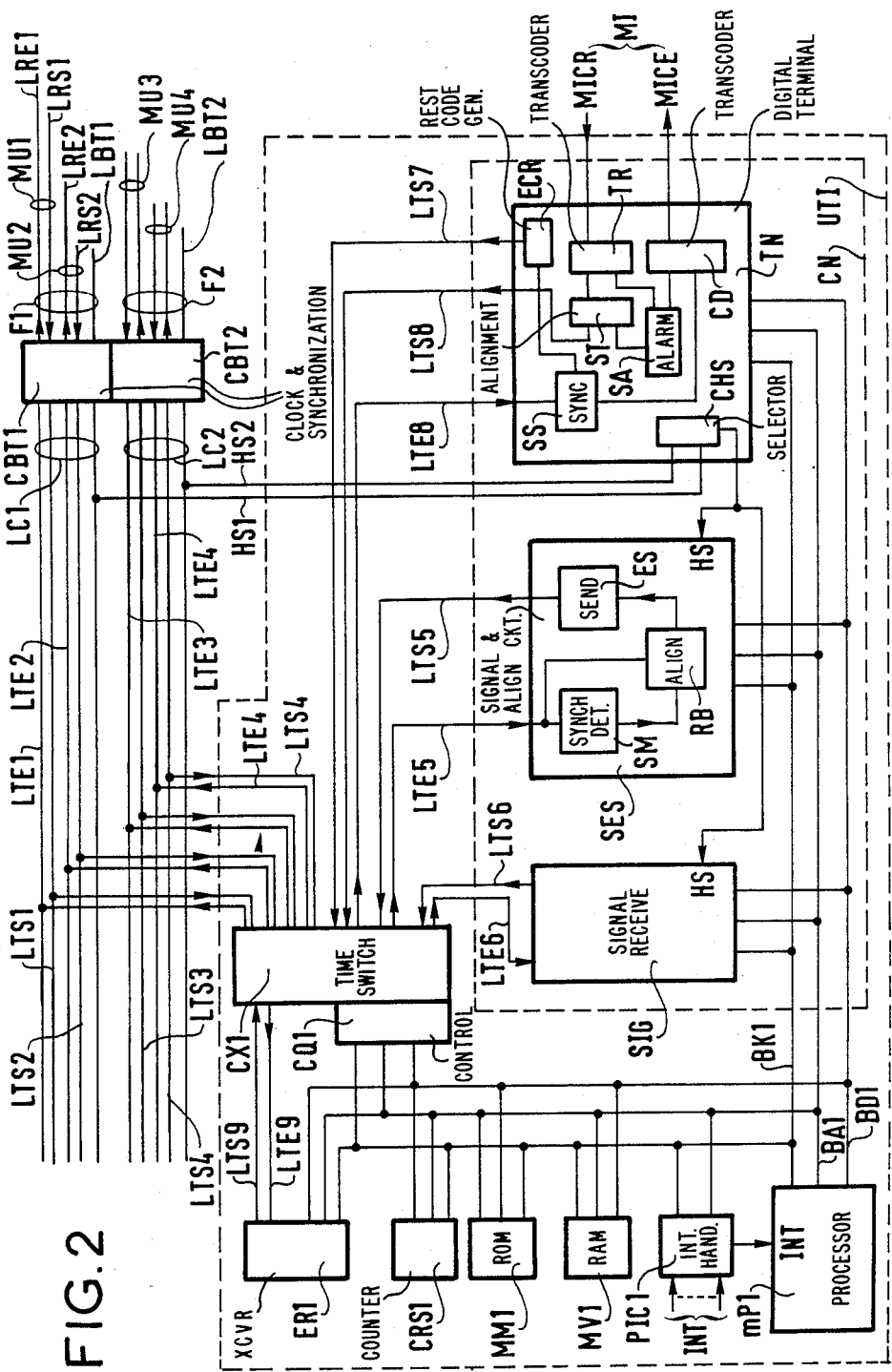
FIG. 2 is a diagram of a terminal unit for use in the present invention.

FIG. 2 shows the constitution of a digital circuit terminal unit UTI in greater detail together with its links to the clock and synchronising circuits CBT which is used in conjunction therewith.

Each clock and synchronising circuit CBT comprises first and second duplicated half-circuits CBT1 and CBT2 each of which is connected to a respective bundle F1 or F2 and each of which serves a respective bundle LC1 or LC2.

Each bundle F comprises a single time base link LBT which includes a clock distribution wire and a frame synchronisation distribution wire (not shown) together with two multiplex links MU each of which comprises an inlet network link LRE and an outlet network link LRS, whereby the bundle F1 comprises the following links: LRE1, LFS1, LRE2, LRS2, and LBT1.

Each half circuit CBT1, CBT2 of a clock and synchronisation circuit provides the clock signals and synchronisation signals required by a group of units, and comprises a conventional time base (not shown) which receives clock signals from a distribution module MD via a time base link LBT. These signals are transmitted to all the units of a group by a link for clock signals and synchronisation signals HS, e.g. HS1 for the bundle LC1 leading to the terminal unit UT shown in FIG. 2.

Each half circuit CBT1, CBT2 also comprises conventional synchronisation circuits (not shown) for aligning the phase of the network links LRE and LRS to which it is connected with the internal multiplex inlet links LTE and outlet links LTS which are connected in parallel to all the terminal units of a group GUT.

A terminal unit UTI generally comprises a microprocessor mP1, read-write memory MV1 and read only memory MM1, a time switch CX1 together with its control circuit CQ1, a transceiver ER1 enabling the microprocessor mP1 to send and to receive messages using the HDLC procedure via multiplex links LTE9, LTS9 connected to the switching network CX1, a programmable surveillance counter CRS1, an interrupt handler circuit PIC1 for interrupts applied to the microprocessor mP1, and a digital circuit CN.

The digital circuit CN comprises a digital terminal TN for a two-way PCM junction MI comprising a send link MICE and a receive link MICR, a signalling and alignment circuit SES for the signalling to be sent, and a signalling receiver circuit SIG for receiving the per channel signalling carried by the time slots IT16 in the PCM receive link MICR.

The microprocessor mP1 of a digital circuit terminal unit UTI is connected by an address bus BA1, a data bus BD1, and a control bus BK1 to the memories MM1 and MV1, to the control circuit CQ1, to the surveillance counter CRS1, to the interrupt handler PIC1, to the transceiver ER1, and to the terminal TN and the signalling circuits SES and SIG for the digital circuit CN.

The digital terminal TN and the signalling circuits SES and SIG of a digital terminal unit UTI are also connected to the unit's time switch CX1 by internal inlet and outlet multiplex links LTE and LTS, as the transceiver ER1.

The digital terminal TN serves firstly as an interface between the receive time link MICR and an outlet multiplex link LTS8 and secondly as an interface between an inlet multiplex link LTE8 and the send time link MICE. For this purpose it includes circuits which are specific to one or other direction of transmission and a circuit which is common to both CHS for selecting clock signals and synchronisation or alignment signals.

The selector circuit CHS in a digital circuit terminal unit serves to select, under the control of the unit's microprocessor mP1, signals transmitted over one or other of the two clock signal and synchronisation signal links HS1 and HS2 to which the unit is connected.

Transmission between a receive time link MICR and an outlet multiplex link LTS uses the following:
a transcoder TR for converting signals received in HDB3 code via the receive time link MICR into binary for onward transmission over the outlet multiplex link LTS8;
a frame alignment circuit ST for aligning the binary signals received from the transcoder TR for their onward transmission over the outlet network link LTS8; and
an alarm circuit SA connected to the outputs of the transcoder TR and of the alignment circuit ST to detect alarms and to announce them.

Further, a rest code generator circuit ECR is connected to an outlet multiplex link LTS7 for sending a rest code over channels which are unused under the control of the microprocessor mP1 of the terminal unit UTI at a rate fixed by the clock signals and the synchronising signals transmitted by the clock select circuit CHS.

Transmission between an inlet multiplex link LTE and the receive time link MICR uses a circuit SS for injecting a frame synchronising signal, which circuit SS is inserted together with the inlet multiplex link LTE8 at the input of a transcoder CD which provides the send time link MICE with HDB3 signals on the basis of received binary signals.

The synchronising and alignment circuit SES essentially comprises means for analysing multiframe synchronisation SM in an inlet multiplex link LTE5, an alignment circuit RB connected to the multiframe synchronisation analysis circuit SM and to the inlet multiplex link for resynchronising signals from the mixer and separator unit UTB relative to the local multiframe signal, and a signalling sender circuit ES connected to the alignment circuit RB and having its output connected to an outlet multiplex link LTS5.

The signalling receiver circuit SIG which is also connected both to the inlet multiplex link LTE6 and to the outlet multiplex link LTS6 serves to receive signalling from channel 16 over the receive time link MICR via the link LTS8 and the time switch CX1.

The signalling circuits SIG and SES in a digital terminal unit UTI are also connected to the output of the clock select circuit CHS whence they receive signals, and to the microprocessor mP1 buses BA1, BD1 and BK1, as is the digital terminal TN.

Figure 3:
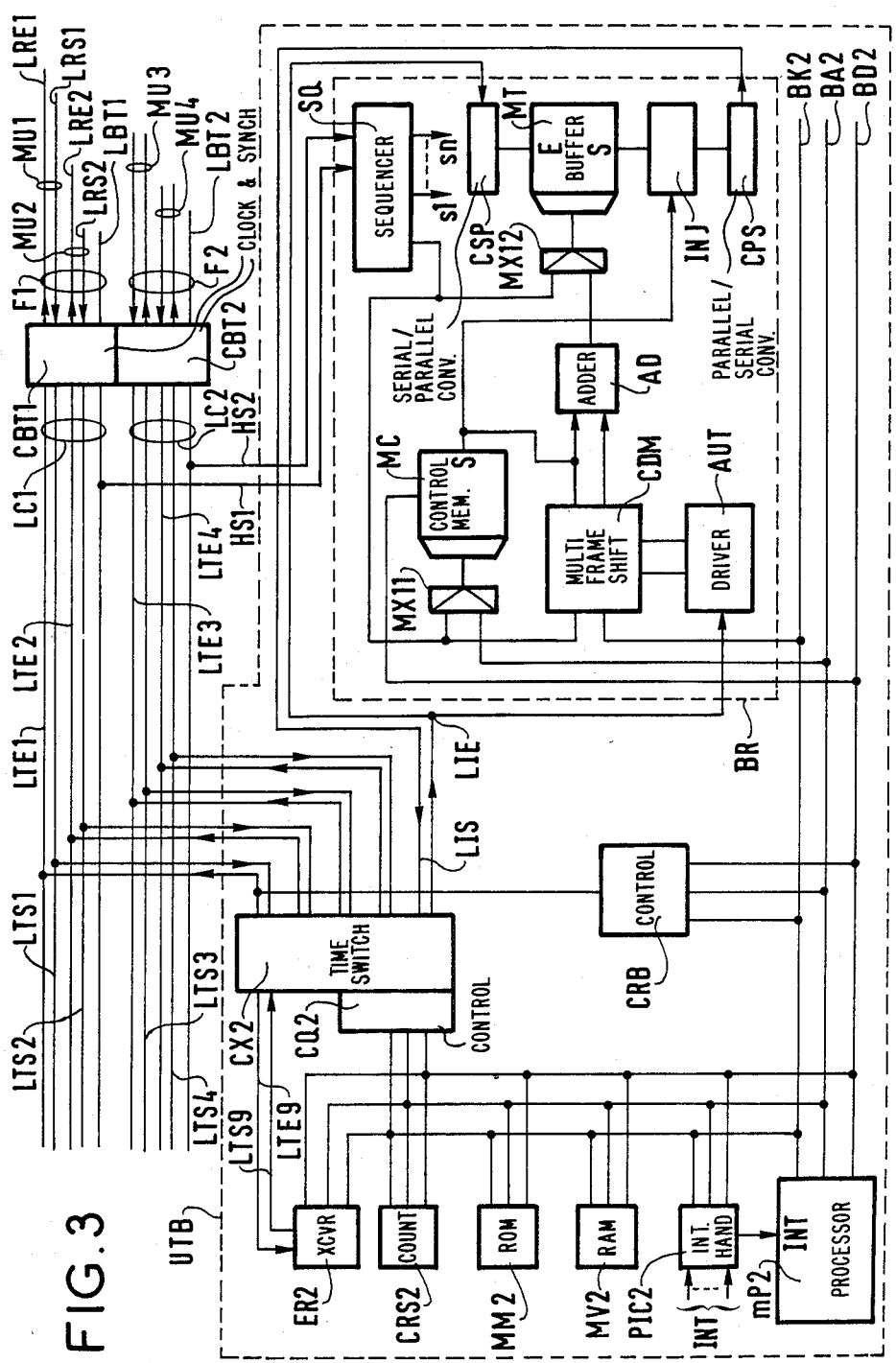
FIG. 3 is a block diagram of a mixer and separator terminal unit for use in the present invention.

FIG. 3 shows the structure of a mixer and separator unit UTB and its links LTE, LTS and HS with the clock and synchronisation circuit CBT connected to the group of which the unit UTB forms a part. Insofar as the links LTE, LTS and HS are identical to those described above for the digital terminal units UTI, and as the clock and synchronisation circuit CBT is likewise identical, these links and this circuit have the same references and are not described in full again.

Thus, as indicated above, the group GUTB of mixer and separator units UTB have the same general structure as a group of digital circuit terminal units UTI.

A mixer and separator terminal unit UTB mainly comprises a microprocessor mP2, read-write memory MV2, read only memory MM2, a time switch CX2 together with its control circuit CQ2, a transceiver ER2 enabling the microprocessor mP2 to send and to receive messages using the HDLC procedure over links LE2 and LS2 connected to the time switch CX2, a programmable surveillance counter CRS2, an interrupt handler circuit PIC2 for the microprocessor mP2, a mixer and separator BR together with its control circuit CRB, an address bus BA2, a data bus BD2, and a control bus BK2.

A mixer and separator BR serves j digital circuits CN, e.g. thirty-two circuits which corresponds to 960 telephone channels.

Under the control of the control units UC (FIG. 1) the switching network RCX connects time slots No. 16 which convey the signalling on the tie line channels in the j digital circuits CN served by a mixer and separator BR towards j channels in the multiplex links MU which serve a group GUTB of mixer and separator terminal units UTB containing the mixer and separator BR under consideration.

Under the control of the microprocessor mP2, the time switch CX2 connects the j=32 time slots to an inlet multiplex link LIE (FIG. 3) serving the mixer and separator BR. The mixer and separator then re-orders the signalling for each time slot which is received in the form of a nibble (four bits) and reconstitutes j=32 signalling time slots over an outlet internal link LIS which connects it to the time switch CS2. At full capacity, a mixer and separator is suitable for re-ordering 960 signalling nibbles.

The mixer and separator BR also manages multiframe alignment, since although the signal channels from the different digital circuits CN are aligned at frame level, the position of the multiframe synchronising signal is random at the input to the mixer and separator BR.

In order to apply mixer and separator instructions, which comprise a channel number and a frame number, the mixer and separator BR must thus:

establish a reference signal for sending synchronised channels and synchronised multiframe synchronising signals over the outlet multiplex link;

detect the multiframe synchronising signal in each inlet channel and store the offset of said signal relative to the reference signal, said offset being measured as a number of frames (in normal operation the offset for any given channel does not change); and deal with irregularities, particularly when a frame is skipped or transmitted twice and when multiframe synchronising signals are lost.

For a full description of the characteristics of frames and multiframes, the reader should refer to CCITT recommendation G 732.

On unused channels, the mixer and separator must nonetheless transmit a rest code.

Mixing and separation is performed by means of a buffer memory MT which is connected to the inlet multiplex link LIE by a serial-to-parallel converter circuit CSP. The memory MT operates on eight-bit words or bytes. The memory is read in nibbles, and the bytes to be sent are made up by an injection circuit INJ which is connected to the outlet multiplex link LIS by a parallel-to-series converter CPS.

A sequencer SQ operating at a multiframe period receives the signals on the links HS and distributes channel addressing signals in synchronisation with the above-mentioned reference signal, together with signals s1 to sN for sequencing the internal operation of the mixer and separator BR.

Multiframe synchronisation signals are processed by a driver AUT which is connected to the inlet multiplex link LIE and to a multiframe shift circuit CDM.

The mixer and separator memory MT performs mixing and separation by being addressed via a multiplexer MX12:

for writing it is addressed sequentially under the control of the sequencer SQ; and for reading it is addressed under the control of an adder AD which adds the frame offset given by the circuit CDM to the byte address given by the control memory MC.

The general mixing and separating process for a tie line transiting through the exchange from a time slot y in a PCM link connected to one of the digital circuit terminal units in one of the groups GUTI and a time slot z of a PCM link connected to one of the digital circuit terminal units in a group GUTJ is as follows:

the tied connection is set up by a command from a peripheral PF, e.g. an operator terminal PF4 and it is transmitted from the peripheral control unit UCP to be recorded in the memory of a control unit UC;

the control unit UC coordinates the markers in the switching network RCX to set up a semi-permanent connection between speech channels y and z;

the identities of the channels y and z are sent to the digital circuit terminal units in the groups GUTI and GUTJ which are concerned, and also to the mixer and separator unit UTB;

the signalling channels associated with the speech channels y and z are interconnected in a totally transparent manner via the relevant terminal unit UTI, the switching network RCX, the relevant mixer and separator unit UTB, back through the switching network RCX and finally through the relevant terminal unit UTJ.

FIGS. 4 to 7 show the circuits which are directly concerned with implementation of the present invention in greater detail, and it should be observed that in the following description the term "gate" may apply, where appropriate, to a set of identical elementary gates which are under common control.

Figure 4A:
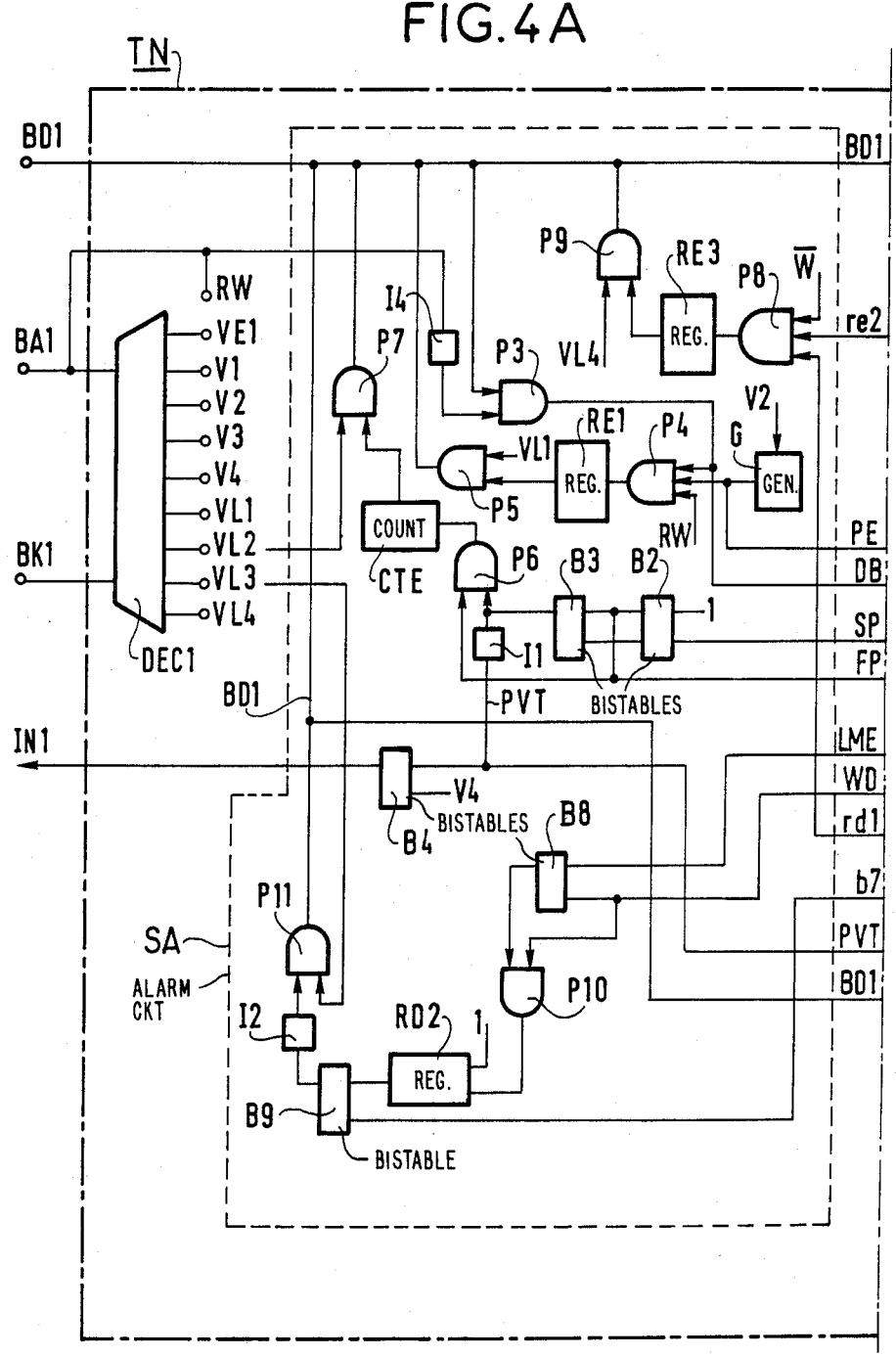
FIGS. 4A and 4B together constitute a more detailed circuit diagram of a digital terminal for use in the present invention.
Figure 4B:
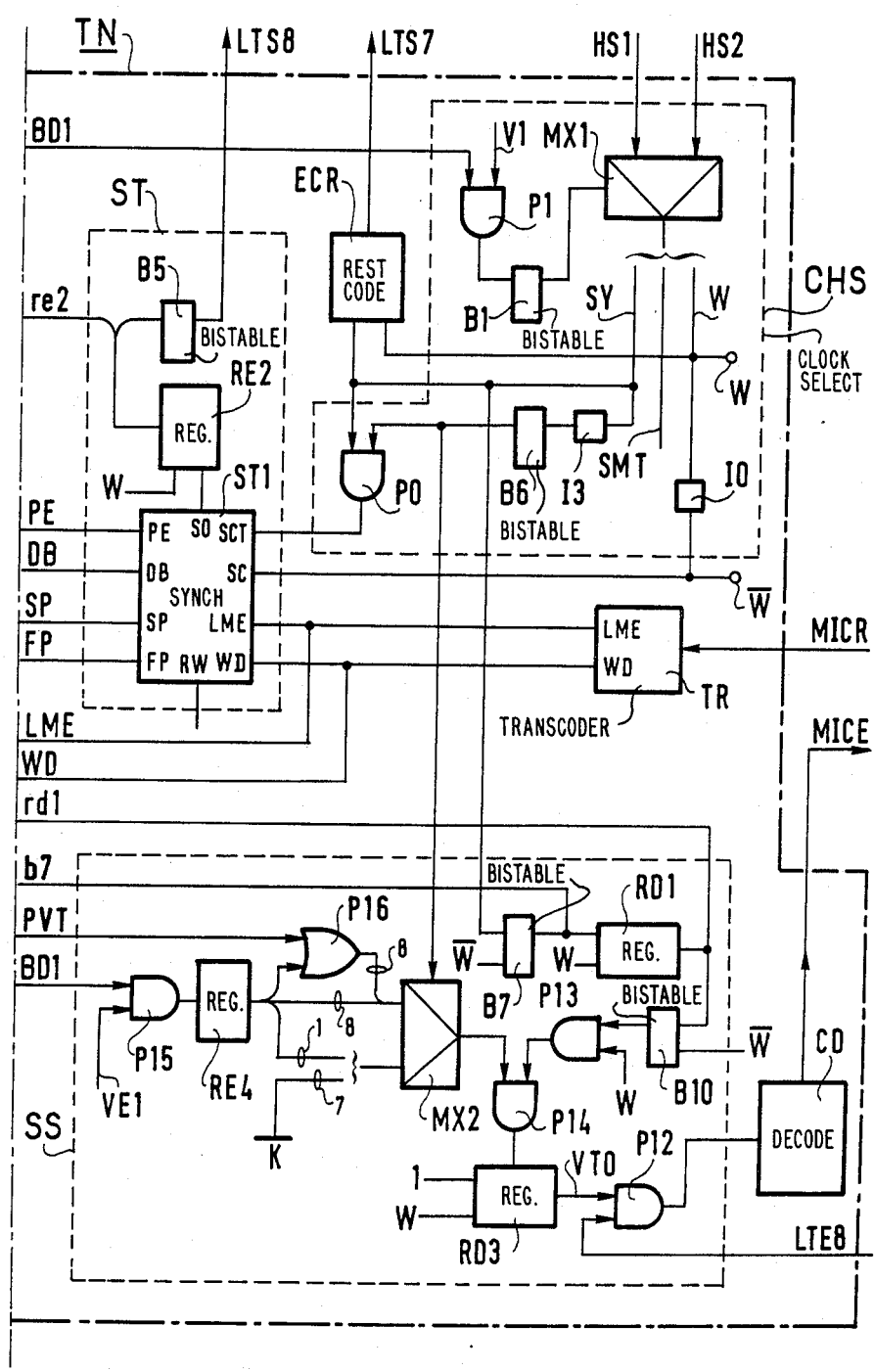

The digital terminal shown in detail in FIGS. 4A and 4B comprises a decoder DEC1 connected to the microprocessor mP1 of the terminal unit UTI which includes said terminal via the address bus BA1 and the control bus BK1. The decoder DC1 provides enabling signals V1 to V4, a write signal VB1 and read signals VL1 to VL4.

In the same terminal TN, the clock select circuit CHS includes a multiplexer MX1 having its inputs connected to the clock signal and synchronisation signal links HS1 and HS2. At its output it delivers a clock signal W, a complemented clock signal W via an inverter IO, both clock signals operating at 2048 KHz in the embodiment described, together with a frame synchronising signal SY and a multiframe synchronising signal SMT.

The multiplexer MX1 is addressed by a bistable B1 under the control of an AND gate P1 which receives the enable signal V1 from the decoder DEC1 and an indication of the link HS selected by the microprocessor mP1 of the terminal unit via the data bus BD1.

The transcoder TR provides transcoded binary signals LME and a remote clock signal WD on the basis of signals in HDB3 code as supplied by the receive time link MICR.

Frame synchronisation or alignment is provided by a conventional alignment circuit ST1, e.g. an SM300-type circuit manufactured by the Siemens company, said circuit ST1 providing synchronised binary signals at its output SO on the basis of signals received at its input LME connected to the transcoder TR.

The synchronising circuit ST1 is arranged to monitor differences between the remote clock WD and the local clock W which is supplied to it in complemented form W via an input SC. Where necessary it skips or copies a frame.

An output SP from the synchronising circuit ST1 indicates that a frame synchronising signal has been detected in the signals received from the transcoder TR. If a frame synchronising signal is not recognised, a pulse is provided on an output FP of the circuit ST1 and the output SO is maintained in the 1 state so as to produce a signal representative of loss of synchronisation for the purpose of the downstream circuits.

In the alarm circuit SA, two bistables B1 and B2 and an inverter I1 provide a frame synchronisation loss signal PVT which, via a bistable B4, causes an interrupt request IN1 to be applied to the interrupt handler circuit PIC1 of the terminal unit UTI, and which enables an alarm bit to be placed in a synchronising signal as sent over the send time link MICE as explained in greater detail below.

The nature of the alarm is indicated to an output DB of the synchronising circuit ST1 which is read by the microprocessor mP1 of the terminal unit UTI. To do this, a generator G which is enabled by enable signal V2, sends an impulse to the input PE of the synchronising circuit ST2 and to one of the inputs of an AND gate P4 which is also connected to the output DB and which receives a signal RW. The AND gate P4 feeds a register RE1 whose output is connected to the bus BD1 via a gate P5.

The gate P5 connects the register RE1 to the bus BD1 on reception of a read enable signal VL1.

An AND gate P3 connected to the bus BD1 by one of its inputs and receiving a complemented signal RW via an inverter I4 also provides access to the register RE1 via the input to the gate P4 which is connected to the output SB.

Changes of state in the output SP of the synchronising circuit SP1 are counted by a counter CTE which is connected to the output of the bistable B3 via an AND gate P6 which is opened by a pulse sent to the output FP of the circuit ST1. The counter CTE is read by the microprocessor mp1 via the data bus BD1 and an AND gate P7 which is enabled by an enable signal VL2.

The output SO from the module ST1 which provides the signals coming from the receive time link MICR after transcoding and resynchronisation, is connected to the input of a register RE2 whose output provides access to the outlet multiplex link LTS8 via a bistable B5. The synchronisation word sent over the link LTS8 may be read by the microprocessor mP1 of the terminal unit UTI, and to do this it is loaded into a register RE3 which is connected via an AND gate P8 at the output of the register RE2 in parallel with the bistable B5.

The loading instant under the control of the gate P8 is fixed by a synchronisation circuit connected to one of the inputs of the gate P8. This instant is determined by the synchronisation signal SY applied to a bistable B7 whose output is fed to a shift register RD1 having its output connected to the above mentioned input to the gate P8.

Loss of synchronisation on the receive on the received time link MICR is indicated by the appearance of a succession of 1 value bits at the output of this link.

An alarm is triggered when there are at least eight zero state bits in a frame, this is monitored by means of a shift register RD2 connected to the links LME and WD coming from the transcoder TR via an AND gate P10 and a bistable P8. The register RD2 is read by the microprocessor mP1 of the terminal unit UTI via an AND gate P11 whose output is connected to the data bus BD1 and having one input connected to receive the read enable signal VL1 and its other input connected to receive the signal from the shift register RD2 via an inverter I1 in series with a bistable B9 connected to the output from the register RD2 and the bistable B7.

The frame synchronisation signal VTO is transmitted over the send time link MICE to the input to the decoder CD by means of an AND gate P12 which receives the signal VTO on one input and the signals from the inlet multiplex link LET8 on a second input. For this purpose, the microprocessor mP1 controls the generation of binary signals of value 1 during the injection period for the signal VTO, while during the corresponding period in the other channels the terminal itself maintains the signal VTO at the 1 level. The signal VTO is provided at the output of register RD3 which receives the even frame synchronising signals VTP or the odd frame synchronising signals VTI from a multiplexer MX2 via an AND gate P14 which has another input connected to the output of register RD1 via an AND gate P13 and a bistable B10, the AND gate B13 is controlled by the clock signal W and a bistable B10 by its complement W.

Bits two to eight of the even frame synchronizing signal VTP are hard-wired (K), while bit 1 of this signal and the eight bits of the odd frame synchronising signal VTI are provided by the microprocessor mP1 of the terminal unit UT1 via the data bus BD1, a gate P15 enabled by a write signal VE1, and a register RE4 connected to the multiplexer MX2.

The multiplexer MX2 is controlled by the synchronisation signal SY via an inverter I3 and a bistable B6 whose output is also connected to an input SCT of the synchronisation circuit ST1 via an AND gate P0 whose other input receives the signal SY.

Bit three of the odd frame synchronizing signal VTI may also be set to 1 by the digital terminal TN via an OR gate P16 connected to an input of the multiplexer MX2, in the event of frame synchronisation being lost. The gate P16 receives both the frame synchronisation loss signal from the inverter I1 and the output from the register RE4.

As mentioned above, under the control of the microprocessor mP1, a rest code is permanently applied on the outlet multiplex link LTS7 by a conventional circuit ECR under the control of the signals SY and W in such a manner as to occupy those time slots which are not used by the digital terminal TAB.

Figure 5A:
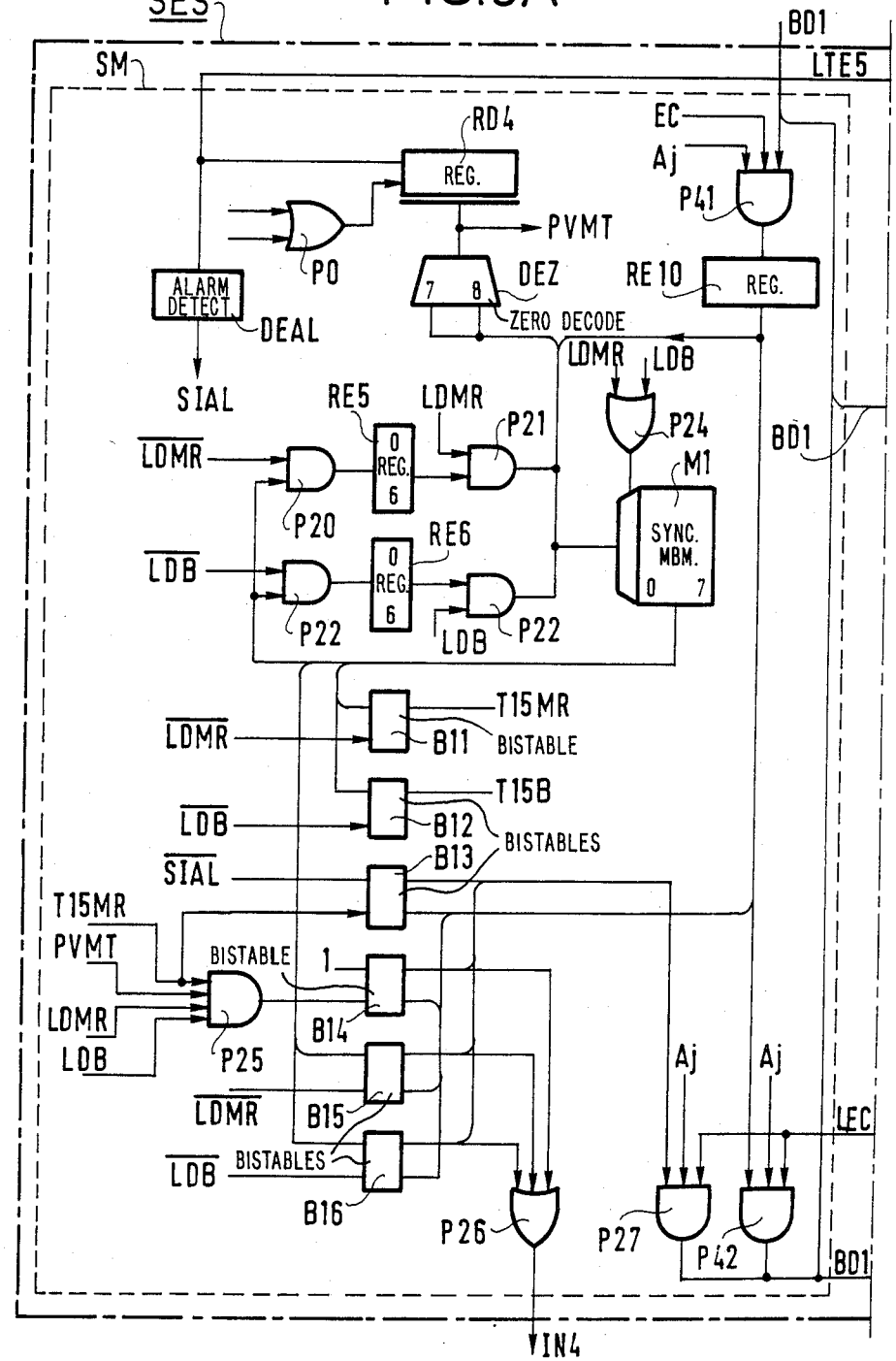
FIGS. 5A and 5B together constitute a more detailed circuit diagram of a signalling and alignment circuit for use in the present invention.
Figure 5B:
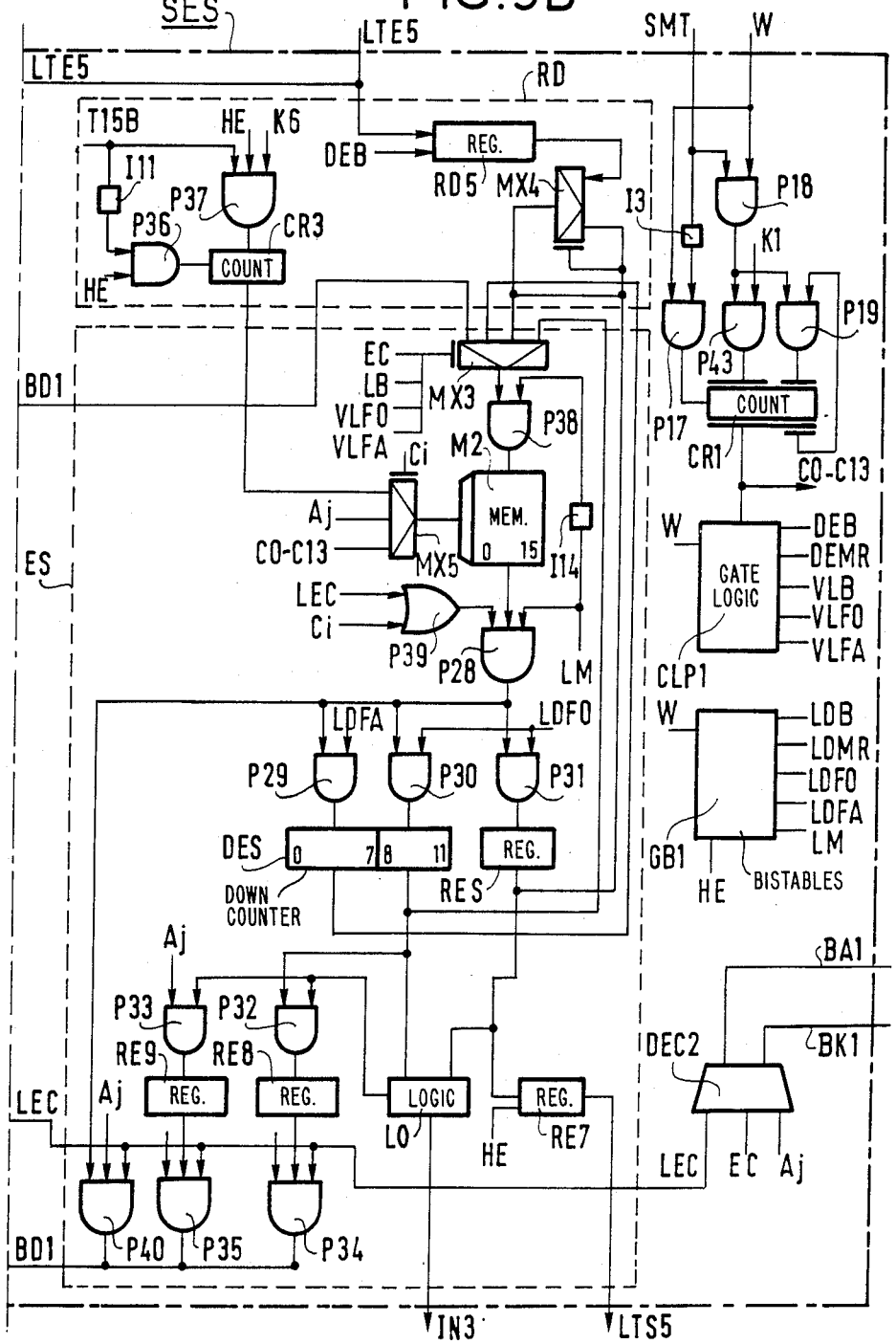

The synchronizing and signalling circuit SES shown in FIGS. 5A and 5B is essentially constituted as described above by means for seeking multiframe synchronisation SM, a circuit RB for synchronising the signal from the mixer and separator CB relative to the local multiframe signal, and a signalling sender circuit ES.

The signalling and synchronization (or alignment) circuit SES operates on super multiframes of four frames each, thereby increasing the number of signalling channels that can pass via channel sixteen. In a normal frame, one bit in frame time slot sixteen corresponds to a channel operating at 512 Hz, while using a super multiframe as mentioned above, one bit in frame time slot sixteen can be used to obtain one 512 Hz channel, two 256 Hz channels or four 128 Hz channels per multiframe. Multiframe synchronization is successively sought for the channel signals coming from the receive time link MICR and for the channel signals coming from a mixer and separator CB. To do this, the time switch CX1 switches the signalling coming from the receive time link MICR to channel thirty-one of the inlet multiplex link LCE5 and the tie line signalling on channel fifteen of the same link LTE5.

The signalling and alignment circuit SES uses firstly the addressing signals Aj, the write and read enabling signals EC and LEC provided by a decoder DEC2 connected to the address bus BA1 and the control bus BK1 associated with the microprocessor mP1, and secondly clock signal W and frame synchronizing signals SY and multiframe synchronizing signals SMT supplied by the clock select circuit CHS included in the digital terminal TN associated with the circuit SES in the same terminal unit UTI.

The internal stages of operation of the synchronising and signalling circuit SES are determined by a binary counter CR1 driven by the clock signal W and synchronised by the multiframe synchronisation signal SMT via a set of AND gates P17, P18, P19, P43 and an inverter I3 suitable interconnected.

The binary counter CR1 is a fourteen-bit counter whose least significant three bits C0 to C2 designate a bit number, whose next five bits C3 to C7 designate a time slot number whose four next most significant bits C8 to C11 designate a frame number within a multiframe and whose two most significant bits C12 and C13 identify a multiframe within a super multiframe.

Bits C0 to C11 are loaded with an initial value K1 while bits C12 and C13 are reloaded via the gate P19 in order not to lose multiframe numbers.

The various stages of operation of the synchronising and signalling circuit are obtained either directly from the outputs of the counter CR1 or via a gate logic circuit CLP1. Further, if a particular stage must be in synchronisation with an edge in the clock signal W, a group of bistables GB1 under the control of the clock signal W is also used, said group GB1 also providing a send clock signal HE.

The main signals provided by the circuit CLP1 are as follows:
an enable signal DEB for the receive stage for receiving a signal from a mixer and separator CB via the inlet multiplex link LTE5;
a signal DEMR for a receive stage for receiving a signal from a receive time link MICR via the inlet multiplex link LTE5;
a signal VLB for enabling the mixer and separator CB signal to write in a send memory M2;
a signal VLFO for enabling access to a more significant byte to store in the send memory M2; and
and signal VLFA for enabling access to a less significant byte to store in the send memory M2.

The main signals provided by the set of bistables GB1 are as follows:
the send clock signal HE
a signal LDB for seeking multiframe synchronisation from the mixer and separator CB;
a signal LBMR for seeking multiframe synchronisation from the receive time link MICR;
two read signals LDFO and LDFA for reading the signalling send memory M2 to obtain two successive bytes therefrom comprising a more significant byte and a less significant byte; and
a signal LM for read/write control of the send memory M2.

The device for analysing multiframe synchronisation SM comprises a synchronisation memory M1 of the REPROM (reprogrammable read only memory) type which in this case stores 4 K eight-bit words. The synchronisation state of the multiframe VMT being represented by eight bits.

Of these eight bits, the four first bits are referenced 0 to 3 and serve to count frames, during multiframe synchronisation detection VMT, these four bits are set to zero and indicate the first frame as being frame zero of a multiframe, subsequently the count indicates the number of the frame being processed.

The fifth bit referenced 4 is intended to indicated whether or not a synchronisation word has been recognised in the first frame of the multiframe.

The sixth bit referenced 5 is intended to indicate that the received byte is composed entirely of zeros, it is updated by each frame regardless of the synchronisation state and it is used for detecting zero value bits in the signalling time slot IT16 during one or two successive multiframes and when a multiframe locking signal is recovered to indicate that the preceding time slot IT16 was received with at least one bit at value one.

The seventh bit referenced 6 indicates loss of multiframe synchronisation PVMT after receiving two erroneous multiframe synchronisation signals.

The eight bit referenced 7 indicates the processing of the last frame of a multiframe.

The first seven bits of the multiframe synchronisation signal are stored in a state register RE5 for processing the signalling coming from the receive time link MICR and in a state register RE6 for signalling received from the mixer and separator CB. The state registers RE5 and RE6 are connected to the output of the synchronisation memory M1 via respective AND gates P20 and P22. The AND gate P20 corresponding to the state register RE5 is enabled by a complemented version LDMR of the multiframe synchronisation search signal LDMR, and the AND gate P22 corresponding to the state register RE6 is enabled by a complemented version LDB of the multiframe synchronisation search signal LDB.

The multiframe synchronisation search signals LDMR and LDB selectively enable the synchronisation memory M1 via an OR gate P24 to whose inputs they are respectively connected, and selectively enable AND gates P22 and P23 connected to the outputs of the state registers RE5 and RE6 respectively connected said outputs to addressing inputs of the synchronisation memory M1.

Thus, during each multiframe synchronisation seek cycle, the synchronisation memory M1 is addressed in order to generate a new state word by means of the following bits:
the seven bits 0 to 6 characterising the preceding state which are stored in the state register RE5 or RE6;
two bits 7 and 8 indicating the state of the two nibbles in received time slot sixteen; in order to do this the outputs from a signalling register RD4 are connected to the inputs of a zero state decoder DEZ whose two outputs indicate respectively that a corresponding one of the two nibbles is in state zero;
a bit 9 enabling the synchronisation memory M1 to be tested by the microprocessor mP1 of the terminal unit UTI; and
bits 10 and 11 indicating the cycle in which the multiframe synchronisation signal VMT is being sought, i.e. either in signals coming from a mixer and separator or from a receive time link MICR.

The microprocessor mP1 of the terminal unit UTI1 controls the transmission of signalling towards the synchronising and signal circuit SES at the desired instance in such a manner as to enable the signalling to be stored in the signalling register RD4. Thus, the two nibbles transmitted during time interval IT16 of the 17th slot in the receive time link MICR are stored during time interval IT31 of the last slot in the frame under the control of the signal DEMR applied to the input of the register RD4 via an OR gate P0.

The two nibbles from the receive time link MICR are processed during time interval IT14 of the fifteenth slot in such a manner as to store the two bits 7 and 8 provided by the zero state decoder DEZ in the synchronising memory M1 under the control of the signal LDMR; said signal LDMR being applied to the OR gate P24.

Likewise, the two nibbles sent from a mixer and separator CB are received by the register RD4 during time interval IT15 of the sixteenth slot under the control of the signal DEB which is applied to the gate PO, and the corresponding two bits 7 and 8 provided by the zero state decoder DEZ are stored in the synchronisation memory M1 under the control of the signal LDB during time interval IT30 corresponding to the penultimate slot of the frame.

Multiframe synchronisation VMT is considered to be lost when two synchronisation signals received in succession are erroneous. In which case the multiframe synchronisation signal VMT is sought in the second frame TR1 and in the last frame but one TR15 to ensure that a frame has not been skipped or repeated at the input to the digital terminal TN before loss or multiframe synchronisation is signalled.

Multiframe synchronisation is also considered to be lost when all the bits of the signalling channel are at the zero state for a duration corresponding to one or two frames.

Multiframe synchronisation is considered to be recovered on detecting at least one bit in the one state during time interval IT16 preceding the first detected multiframe synchronisation signal.

A group of six bistables B11 to B16 serve to store the passage of the last frame of a multiframe and to give an alarm to the microprocessor mP1 by sending an interrupt IN4. The bistables B11, B12, B15 and B16 are selectively connected to the output of the synchronisation memory M1 via their inputs and the set of six bistables is controlled in the manner described above.

Bistables B11 and B12 respectively supply signals T15MR and T15B relating to the last frame of the multiframe respectively from the receive time link MICR and from the mixer and separator CB. These signals correspond to the contents of bits 7 in the synchronisation memory M1 and the bistables are respectively enabled by the complements LDMR and LDB of the multiframe synchronisation seak signals LDMR and LDB.

The bistable B15 and B16 respectively provide loss of multiframe synchronisation signals corresponding respectively to the received time link MICR and to the mixer and separator CB. These signals correspond to the contents of bit 6 in the synchronisation memory M1 and the bistables are respectively enabled by the complements LDMR and LDB of the multiframe synchronisation signals LDMR and LDB.

The bistable B13 provides an indication of a distant alarm SIAL following the detection by logical detection circuit DEAL of alarm data transmitted over the multiplex link LTE5 to which the detection circuit DEAL is connected. The bistable B13 which receives the output signal from the detection circuit DEAL via an inverter I10 is enabled by the signal T15MR supplied by the bistable B11.

The bistable B14 supplies an indication concerning the loss of distant synchronisation as indicated by bit 6 at the output of the signalling register RD4. It is connected to the corresponding output of this register via AND gate P25 which is enabled by simultaneous application of the last frame signal T15MR at the output of the bistable B11, the multiframe synchronisation signal LDMR, the loss of frame synchronisation signal PVMT supplied by bit 6 at the output of the signalling register RD4, and a signal C3 supplied by the counter CR1.

The outputs from the bistable B13 to B15 are connected to an OR gate P26 which supplies an interrupt signal IN4 to the interrupt handler circuit P1C1 of the microprocessor mP1. The microprocessor mP1 has the option of reading the output from the bistables B12 to B16 via a multiple AND gate P27 whose unit gates are enabled by the read signal LEC and by address Ai supplied the decoder DEC2.

Signalling is sent by the send circuit ES by means of a send read/write memory M2 (RAM) in which the microprocessor mP1 of the terminal UTI writes words containing instructions, and including in particular:
send a given bit
authorise a bit from a mixer and separator to transit without being changed
send a bit of specified value for a specified duration e.g. for a duration of two milliseconds to four seconds in two millisecond increments, or in a continuous cyclic manner having a period equal to the multiframe period.

Instructions are constituted in this case by sixteen-bit words which are split into two bytes, namely a more significant byte and a less significant byte. The less significant byte and the four less significant bits of the more significant byte correspond in this case to the duration for which the signalling should be sent, the sixth bit (i.e. bit 4) corresponds to the state of the bit to be sent, the sixth bit is masked and indicates when in the zero state that the channel is a tie-line channel i.e. is reserved for signals coming from the mixer and separator. The seventh bit indicates that there is an interrupt to the signal and the eight bit indicates the state of the bit to be sent taking account of the masked bit and the bit from the mixer and separator.

The inlet to the send memory M2 is controlled by an AND gate P38 which receives signals supplied by multiplexer MX3 and an enable signal which is the complement of the general enable signals supplied at the output from the group of bistables GB1 to an AND gate P28 which controls output from the send memory M2, said signal LM being complemented by an inverter I14 before being applied to the AND gate P38.

The multiplexer MX3 is selectively connected via its data inputs to the data bus BD1, to the output from a multiplexer MX4, to the outputs from a buffer register RES and to two outputs groups from a down counter DES. Selective addressing of the different inputs to multiplexer MX3 is provided:
by a write signal EC which is provided by the decoder DEC2 on instructions to the microprocessor mP1 of the terminal unit UTI for bits coming from the bus BD1;
by an enable signal VALB for enabling bits from the mixer and separator via an inlet multiplex link LTE5 and a shift register RD5 inserted upstream from the multiplexer MX4 and controlled by the receive enable signal DECB as supplied by the logic circuit CLP1; and
by signals for enabling the more or the less significant byte VLFO and VLFA for the bits coming from the register RES, or for a group of more significant bits or a group of less significant bits from the down counter DES.

The multiplexer MX4 has its input selection controlled by a mask bit 13 contained in the register RES, and comprises two inputs one of which is connected to the output from the shift register RD5 and the other of which receives a bit 12 from the register RES.

The send memory M2 is addressed via a multiplexer MX5 suitable for a receiving:

an address Aj provided by the microprocessor mP1 via the address bus BA1 for send instructions supplied via the data bus BD1;

an address C0-C13 supplied by the counter CR1 for recycling information coming from the receive time link MICR; and an address provided by a counter CR3 for recycling information coming from a mixer and separator CB.

The multiplexer MX5 is cyclically plotted by count signals supplied from the counter CR1, which address the send memory M2 once every four channel time interval for constituting an eight bit word destined to the sent via the signalling channel IT16 on the send time link MICE served by the terminal unit UTI under consideration.

During each signalling cycle MIC the send memory M2 is read twice since the send instructions comprise two bytes, said reading being performed under the control of read signals with LDFO controlling one of said bytes and LDFA the other and both of which correspond to a one state of the counter CR1.

The period for which signalling is sent is fixed by the down counter DES which receives twelve bits for this purpose. Thus two gates P29 and P30 share switching of the twelve bits applied to the down counter DES and they are each connected to the output from the AND gate P21 which has an input connected to the output from the memory M2. The AND gate P29 is controlled by the signal LDFA and the AND gate P30 is controlled by the signal LDFO.

The down counter is decremented if bit 11 which is the send duration bit is in state one, corresponding to an instruction to send for limited duration. If the bit is in the zero state, sending is cyclic during each multiframe for a duration which is not limited by counting.

The register RES stores bits 4 to 7 of the more significant byte.

During down counting, the state of the bit to be sent which is fixed by bit 15 of the send instruction is stored in a send buffer register RE7 whose output is controlled by a clock signal HE.

The modified data contained in the down counter DES and the register RES are introduced into the send memory M2 at the same address as the data which gave rise thereto, the counter CR1 having kept its output C5 to C13 in the same state.

When signalling arrives from the mixer and separator BR, the send memory M2 is addressed by the counter CR3 clocked by the clock signal H2 as applied to a gate P36 under the control of the complement of the last frame signal T15B as supplied via invertor I13. The counter CR3 is synchronised by the last frame signal T15B applied to a gate P37 together with the clock signal HE and strapped data K6.

The data coming from the mixer and separator BR is received by the shift register RD5 whose input is connected to the inlet multiplex link LTE5 and which is clocked by the signal DEB as supplied by the logic unit CLP1.

The send memory M2 is read under the control either of a bit Ci at the output of from the counter CR1 or of the signal LEC coming from the microprocessor mP1. Both of these signals are applied to an OR gate P39 whose output is connected to an input of the AND gate P28 which is connected to the output of the send memory M2 and which is controlled by the signal LM.

A logic circuit LO comprising bistables which are not shown, is connected to the outputs of the down counter DES and of the register RES. It serves to send to an interrupt IN3 to the interrupt handler circuit CIP1 for the microprocessor mP1 when a signalling bit has finished being sent. The logic circuit LO also serves to trigger loading of the register RES into a buffer register RE8 via an AND gate P32 together with insertion of the address Aj concerned into a register RE9 via an AND gate P33.

The registers RE8 and RE9 and the send memory M2 are read by the microprocessor mP1 via the data bus BD1 and via respective AND gates P34, P35, and P40 under the control of the read signal LEC and of an address Aj, said gate P40 being inserted downstream from the gate P28.

A control register RE10 is connected via its input to an AND gate P41 which receives data coming from the microprocessor mP1 via the bus BD1, said gate P41 being controlled by the write signal and by an address Ai.

The control register RE10 is connected via its output to the memory M1 for test purposes, to a reset to zero input of the alarm bistables B13 to B16, and to the data bus BD1 via an AND gate P42 which is controlled in a similar manner to the gate P40.

An AND gate P27 serves to connect the bistables P13 to B16 to the microprocessor mP1 via the data bus BD1 for write purposes.

Figure 6:
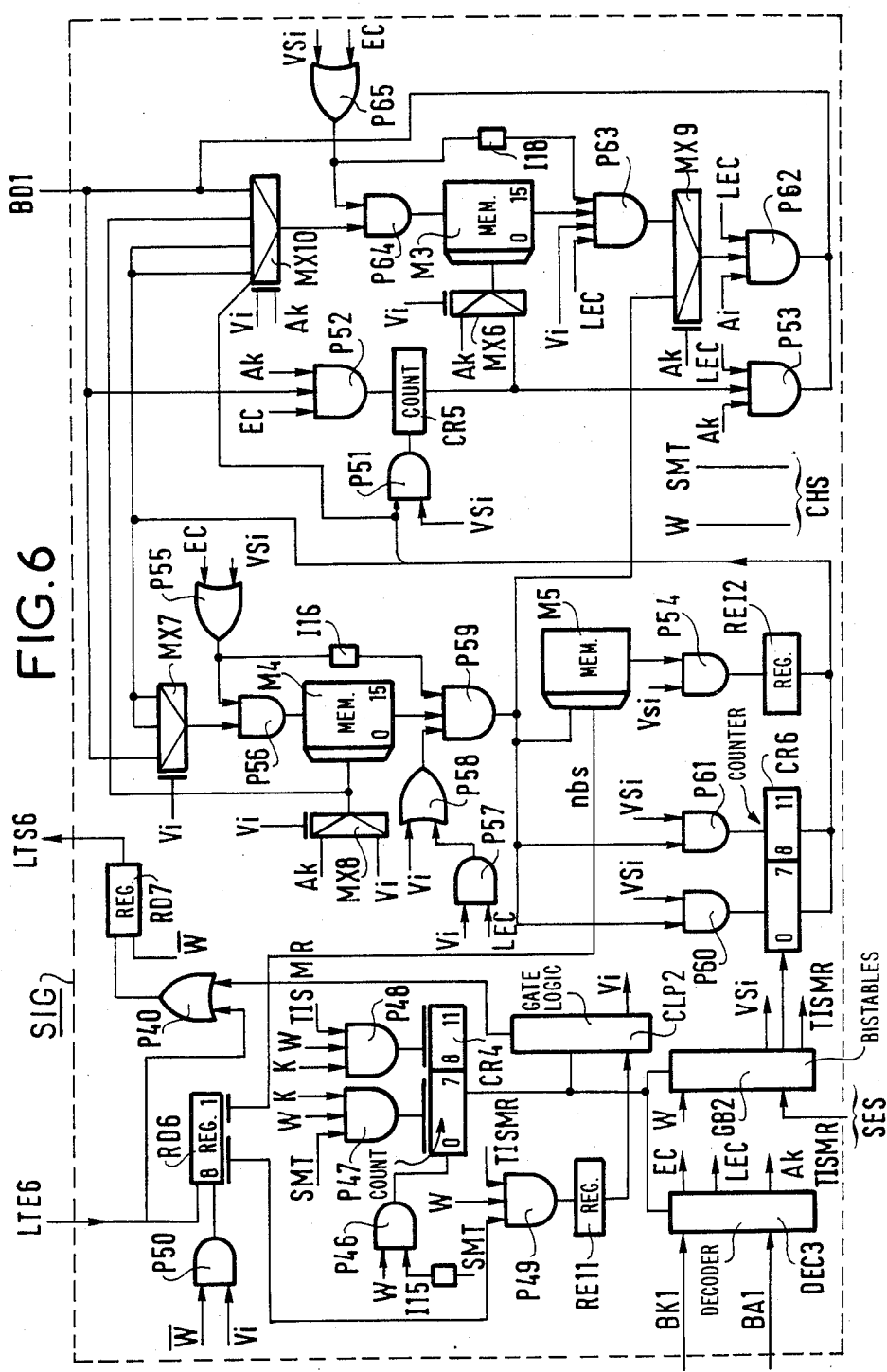
FIG. 6 is a more detailed circuit diagram of a signalling receiver circuit for use in the present invention.

The signalling receiver circuit SIG shown in FIG. 6 receives signalling transmitted over channel sixteen of the receive time link MICR as switched by the mircroprocessor mP1 and via the inlet multiplex link LTE6. It serves to detect changes of state in the signalling bits and to transmit confirmed changes to the microprocessor mP1.

A decoder DEC3 connects the circuit SIG to the address bus BA1 and to the control bus BK1 and deduces a write signal EC from a read signal LEC and two address signals given overall references Ak.

A twelve-bit counter CR4 provides interval synchronisation of the signalling receive circuit SIG on the basis of clock signals W and multiframe synchronisation signals SMT which it receives from the clock select circuit CHS located in the same terminal unit UTI.

A gate logical unit CLP2 and a group of phase-setting bistables GB2 match the synchronisation signals to the needs of the signalling receiver circuit SIG. For this purpose, they are connected to the synchronisation counter CR4, and the logic unit CLP2 which controls the group of bistables GB2 is connected to the decoder DEC3.

The synchronisation counter CR4 has its clock input activated by clock signals W in the absence of a multiframe synchronisation signal SMT of value one, which is performed by using an AND gate P46 which receives the signal SMT via an invertor I15 together with the signal W. Further, the signal SMT for the eight first bits of the counter CR4 and the last frame signal T15MR supplied by the synchronisation of signalling circuit SES for the last four bits provide synchronisation of the counter by means of AND gates P47 and P48 one of which receives the signal W, the signal SMT and strapped data K3 while the other receives signal W, the signal T15MR and strapped data K4.

Signalling from the channel corresponding to slot IT16 in the receive time link MICR coming via the inlet multiplex link LTE6 and for a tie-line is transmitted firstly to a receive shift register RD6 and secondly to a send shift register RD7 via an OR gate P40, the output of said register RD7 being connected to feed the outlet multiplex link LTS6.

The control input of the receive register RD6 is controlled by an AND gate P50 which receives the complement W of the clock signal and one of the enabling signals Vi provided by the logical unit TLP2. The control input to the transmit register RD7 also receives the complement W of the clock signal supplied by the clock select circuit CHS.

The receive register RD6 has its bit 5 and 7 outputs connected to a register RE7 which stores the supermultiframe number as defined by said bits 5 and 7, an AND gate P49 being inserted for this purpose between the registers RD6 and RE7 and controlled by the clock signal W and the last frame signal T15MR transmitted by the group of bistables GB2. The output from the supermultiframe number register RE7 is connected to an input of the logic unit CLP2 in such a manner as to provide access to signalling transmitted over low data rate channels spread out over two or four multiframes.

When the state of a signalling bit received on a given channel changes between successive multiframes, the change of state is written into the state memory M3 used as a FIFO (first in first out) stack which is suitable for being read by the microprocessor mP1 of the unit UTI. For this purpose, the state register MP is addressed via a multiplexer MX6 either by the microprocessor mP1 supplying an address Ak or by a counter CR5. The multiplexer is clocked by a signal Bi coming fom the logic unit CLP2.

Changes of state are detected and confirmed by means of a read/write storage memory M4 and a PROM (programmable read only memory) translation memory M5.

The state of a signalling bit is stored in two consecutive words in a storage memory M4 and comprises:
a bit 15 mask;
bits 13 and 14 which correspond to a confirmation counter for confirming changes of state to avoid the influence of interference signals;
a bit 12 which corresponds to the actual state of the signalling bit under analysis;
a bit 11 which corresponds to the most recent stable state of said signalling bit, i.e. the most recent state which it occupied for at least four seconds; and
twelve bits 0 to 11 corresponding to a duration couner for the new state of the signalling bit.

A new state is deduced from the previous state in the following manner: firstly the storage memory M4 and the receive register R4 and the receive register RD6 simultaneously produce respectively the sixteen bits of two words relating to a signalling bit via an AND gate P59 and the corresponding new signalling bit nbs.

The bit nbs and the five bits 11 to 15 are applied to address inputs of the translation memory M5 which responds with a six-bit word, which word is loaded into a buffer register RE12 via an AND gate P54 under the control of a signal VSi from the group of bistables GB2.

Simultaneously, bits 0 to 11 are applied to the inputs of a counter CR6 via AND gates P60 and P61 under the control of two respective signals DSi supplied by the group of bistables GB2 under the control of the counter CK7. The counter CR6 is incremented by the counter CR4 via the group of bistables GB2.

The twelve bits contained in the counter CR6 and four of the six bits supplied by the translation memory M5 are applied to the input of the storage memory M4 via an AND gate P56 whose inputs are connected to the output of a multiplexer MX7 which is driven by a signal Vi supplied by the logic unit CLP2. The multiplexer MX7 is connected by a second group of inputs to the data bus BD1 so as to enable tests to be performed, while the gate P56 is controlled via an OR gate P55 either by means of the write signal EC or else by means of a signal VSi supplied by the group of bistables GB2.

The storage memory M4 is addressed either by the logic unit CLP2 using a signal Vi or else by an address Sk provided by the microprocessor mP1 via the address bus BA1. The signal VI and the address Ak are both applied to a multiplexer MX8 which is driven by another signal Vi from the logic unit CLP2.

The AND gate P59 at the output from the storage memory M4 supplies the counter CR6, the translation memory M5, and a multiplexer MX9. It is itself controlled by the output signal from the OR gate P55 after being complemented by an inverter I16 and by the output from an OR gate P58 which has one input connected to receive a signal VI from the logic unit CLP2 and its other input connected to receiver signal Vi from the same logic unit after combination with the signal LEC by means of an AND gate P57.

A confirmed change of state is indicated by the most significant bit referenced in the word read from the translation memory M5 being in state one, this bit loaded into register RE12 is supplied to an activation input of a multiplexer MX10 connected to the input of the state memory M3 in such a manner as to enable the contents of the register RE12 and of the counter CR6 to be loaded.

The multiplexer MX10 is driven by a signal Vi coming from the logic unit CLP2 and by an address Ak supplied by the microprocessor mP1 via the address bus BA1. The multiplexer MX10 has four inputs, a first connected to the data bus BD1, a second connected to the output from the addressing multiplexer MX8 for the storage memory M4, a third connected to the output of the register RE12, and a fourth connected to the output from the counter CR6. The connection of the multiplexer MX10 to the data bus BD1 enables the state memory M3 to be tested, a connection of the multiplexer MX10 to the output for multiplexer MX8 enables the identification number of the signalling bit which corresponds to the change of state to be inserted into the state memory.

An AND gate P64 is inserted between multiplexer MX10 and the state memory M3. It is controlled via an OR gate P65 either by the write signal EC or by a signal VSi coming from the group of bistables GB2.

An AND gate P63 is inserted at the output of the state memory M3 upstream from the multiplexer MX9 and it is controlled by a signal Vi from the logical unit CLP2, by the read signal LEC, and by the complement provided by invertor I18 of the output signals from the gate P65 for controlling writing into the state memory.

The multiplexer MX9 has two inputs, one of which is connected to the output of the gate P59 for reading the storage memory M4 and the other which is connected to the output of the gate P63 for reading the state memory M3. The output from the multiplexer MX9 is connected to the data bus BD1 via an AND gate P62 which is controlled by the read signal LEC and an address Ak supplied by the decoder DEC3 which also controls the multiplexer MX9 by means of two other addresses Ak.

The bit ce also causes the counter CR6 to be reset to zero and causes the counter CR5 to advance by means of the AND gate P51 which is controlled by a signal VSi from the group of bistables GB2.

The counter CR5 has its prepositioning inputs connected to the data bus BD1 via an AND gate P52 which is controlled by the write signal EC and by an address Sk from the decoder DEC3.

The counter CR5 which has its outputs connected to the multiplexer MX6 is also connected to the data bus BD1 via an AND gate P53 which is controlled by the read signal LEC and by an address Ak.

Figure 7A:
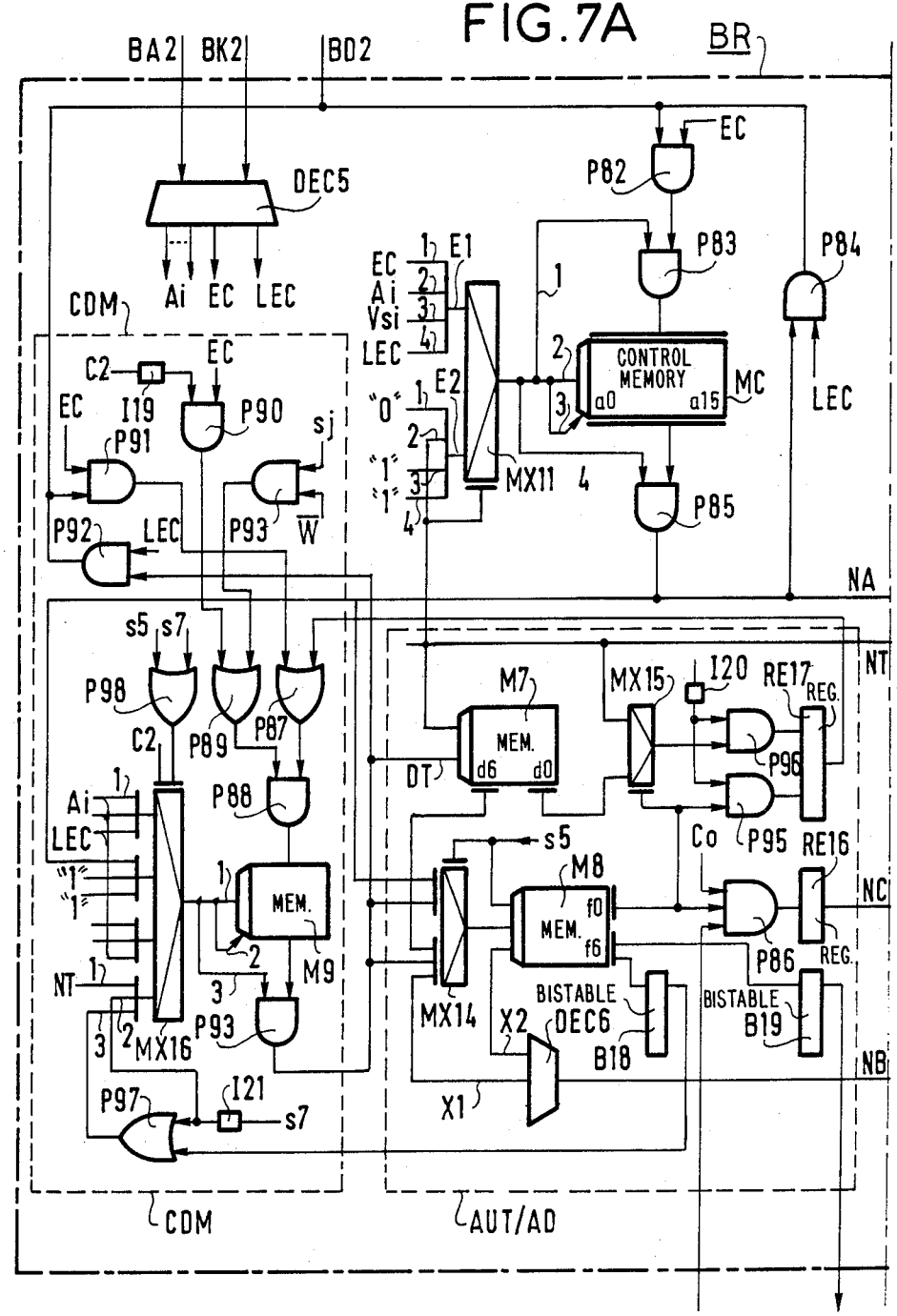
FIGS. 7A and 7B are a more detailed circuit diagram of mixing and separator means for use in accordance with the present invention.
Figure 7B:
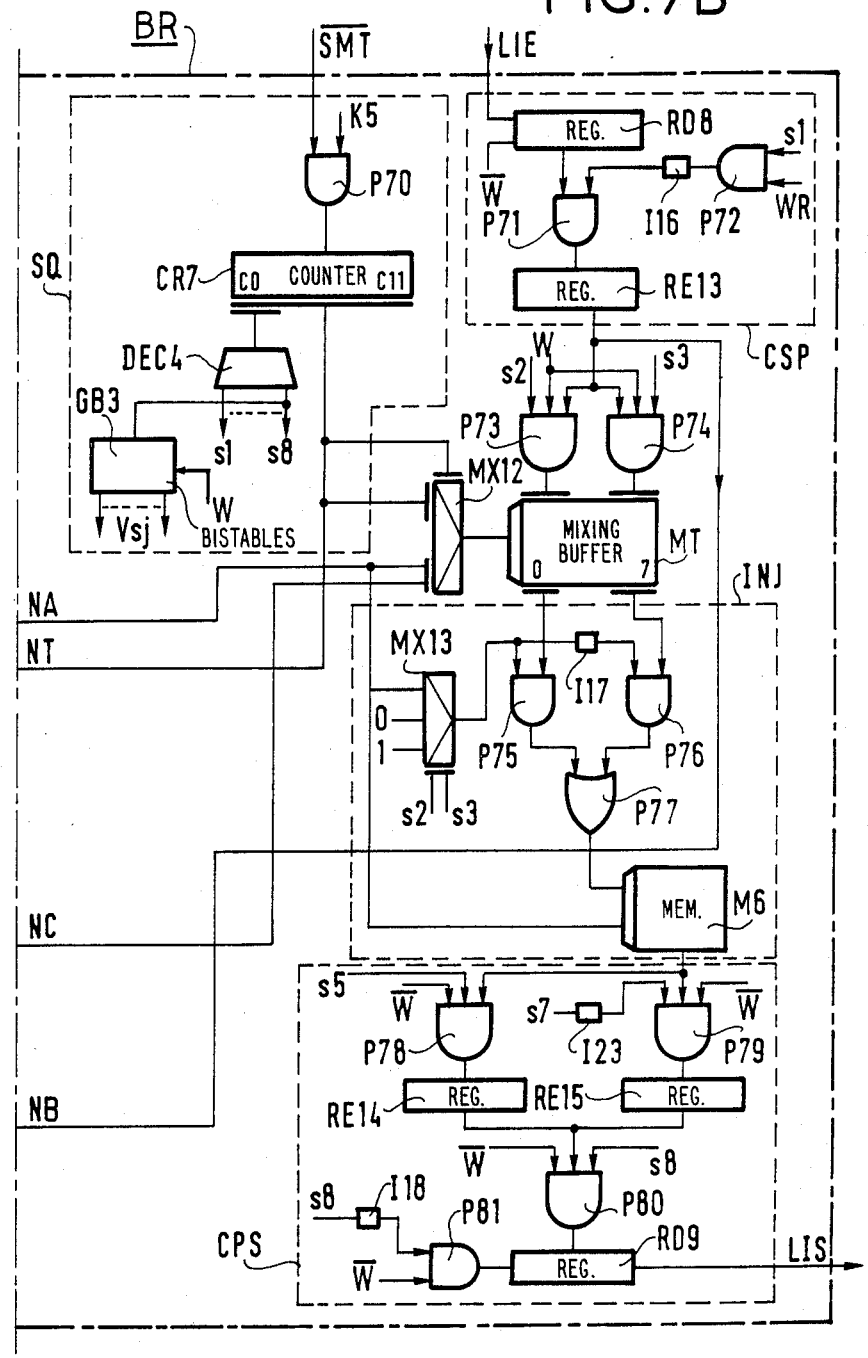

The mixer and separator BR shown in FIG. 7 comprises a decoder DEC5 which provides address signals Si, a write signal EC and a read signal LEC on the basis of information received from a microprocessor mP2 of the mixer and separator unit UTB in which it is included via an address bus BA2 and a control bus BK2 which interconnects the mixer and separator with the microprocessor.

The mixer and separator BR also receives the clock signal W and its complement W, a clock signal WR which is phase shifted by a one quarter period relative to the signal W, and the multiframe synchronization signal SMT and its complement SMT. These signal comes from a circuit (not shown) which is equivalent to the clock select circuit CHS and which is identically connected to the clock signal and synchronisation signal HS1 and HS2 of a circuit CBT.

A sequencer SQ based on a counter CR7 serves to control the sequence of operations to be performed on each channel.

For this purpose, the counter CR7 which includes twelve bit outputs C0 to C11 is clocked by the clock signal W and synchronized by the signal SMT which is supplied thereto via an input of an AND gate P70 whose other input is strapped to a value K5. Bits C0 to C2 supplied by the first three outputs from the counter CR7 are applied to a decoder DEC4 which provides eight sequencing signals in the form of bits s1 to s8 for controlling the sequence of operations during eight successive clock periods. The first half of the operative cycle on each channel as defined by the supply of time signals s1 to s4 and the presence of a bit C4 of value zero is reserved for data interchange with the microprocessor mP2.

A group of bistables GB3 connected to the outputs of the decoder DEC4 and controlled by the clock signal W supplies synchronised enabling signals VSj.

Access to the mixing buffer memory MT is controlled by a series-to-parallel converter circuit CSP having its input connected to the incoming internal link LIE. The circuit CSP is constituted by an input shift register RD8 connected downstream from the incoming internal link LIE and controlled by the complemented clock signal W and by a buffer register RE13 which receives in parallel the eight bits of a signalling channel transmitted by the link LIE via the inlet register RD8 and an AND gate P71 which is enabled by a NAND gate which receives the signals s1 and WR.

AND gates P73 and P74 connected to the output of the register RE13 from which they receive eight bits in parallel are selectively enabled, the first by the clock signal W and the signal s2, and the second by the signal W and the signal s3. These gates apply a selected nibble to the inputs of the mixing memory MT.

The mixing memory MT is addressed by means of a multiplexer MX12 connected firstly to the C3 to C11 outputs from the counter CR7 which define a channel in a frame of the multiframe, and secondly to the output of the control memory MC via a link NA and to the output of a buffer register RE16 via a link NC from a memory which is defined below, the selection of one or other set of inputs to the multiplexer MX12 being performed by the bit C2 which is supplied on the corresponding output of the counter CR7.

The injection circuit connected downstream from the mixing memory MT includes access AND gates P75 and P76 for the nibbles to be mixed in, said gates being connected upstream to two groups of nibble outputs from the mixing memory MT and being selectively enabled in complementary manner by the output signals from a multiplexer MX13 which is connected to an input of the AND gate P75 directly and which is connected to one input of the AND gate P76 via an inverter I17.

The multiplexer MX13 is addressed by the s2 and s3 bit outputs from the decoder DEC4 and it has three inputs: a first input connected to the output of the control memory of the mixer and separator CB; a second input strapped to level zero; and a third input strapped to level one.

The gates P75 and P76 control a nibble-generating PROM M6 via an OR gate P77 in connection with bits a12 to a15 which define the parameters of the codes used and which are supplied by the control memory MC.

The parallel-to-series converter circuit at the output of the memory M6 receives the two nibbles intended to constitute a byte in two buffer registers RE14 and RE15 via AND gates P78 and P79 which are controlled by the complemented clock signal W and also by the s6 output signal from the decoder DEC4 in the case of the gate P78 and the s7 output signal therefrom in the case of the gate P79.

The outputs from the buffer registers RE14 and RE15 are conected to a send shift register RD9 via an AND gate P80 which is controlled by the complementary clock signal W and the sequencer signal s8 from the decoder DEC4. The send register which receives the bits of the nibbles in parallel serves to send them in series over the send internal link LIS under the control of an AND gate P81 which receives the complementary clock signal W and a signal supplied by an inverter I18 downstream from the output s8.

The control memory MC of the mixer and separator BR is RAM, it contains mixing instructions and it is connected for this purpose via its inputs to the data bus BD2 of the microprocessor mP2 via two AND gates P82 and P83 connected in series. The gate P82 is enabled by the write signal EC and the gate P83 is enabled by a bit marked 1 and put in the one state of the signal from the multiplexer MX11 which controls control memory addressing.

The control memory MC is connected via its a0 to a15 bit outputs to an AND gate P85 which is enabled by a write instruction 1 from the address multiplexer MX11, the output of the gate P85 is connected to the multiplexer MX12, to the data bus BD2 by a gate P84 which is enabled by the read signal LEC, to the adder AD, and to the multiframe shift (or offset) circuit CDM.

The address multiplexer MX11 has two groups of inputs E1 and E2, with the group E1 comprising first inputs referenced 1 to 4 reserved for the microprocessor mP2 from which the address multiplexer receives the write signal EC, the read signal LEC, address signals Ai, and a timing signal VSi from the group of bistables GB3, while the second group E2 comprises second inputs referenced 1 to 4 reserved to the sequencer counter CR7 from which the address multiplexer receives bits C1 and C3 to C11 via the inputs referenced 2 with the second inputs 1 being strapped to zero and the second inputs 3 and 4 being strapped to one. The output of the multiplexer MX1 supplies bits appearing on the inputs referenced 2 and 3 under the selective control of bit C2 from the counter CR7. These output bits are applied to the addressing inputs 2 and to the write enable input 3 of the control memory MC.

The addresses supplied by the counter CR7 include ten bits and enable two mixing instructions to be delivered, ie. one instruction per nibble in a given byte.

Each mixing instruction operates on a single nibble and comprises sixteen bits referenced a0 to a15 which have the following meanings:

a0 is a bit for selecting one of the nibbles in the signalling byte;

a1 to a9 define the address of the byte in a multiframe by means of its frame number and of its channel number;

a10 to a11 define the state of the channel (at rest, normal state, loss of synchronisation, ...); and a12 to a15 correspond to parameters of the codes being used, eg. the rest code, or the alarm code, these parameters are processed by the injection circuit INJ which receives them from the mixing memory MT.

The driver AUT and the adder AD are organised around two PROMs M7 and M8.

The driver's frame state memory M7 is suitable for storing 256 seven-bit words (d0 to d6). It is addressed by the number of the current frame NT which is supplied thereto by the four bits C8 to C11 at the output from the counter CR7 of the sequencer SQ via the link NT, and by a shift or offset value DT which is supplied thereto by the multiframe shift circit CDM. The memory M7 provides firstly the number of the frame decremented by one (ie. NT−1) on output bits d0 to d3, and a case analysis on output bits d4 to d6.

Said case analysis gives the following varieties:
d6=0 if NT=0.
d6=1 if NT=not zero.
d4=0; d5=0; if NT=DT−1.
d4=1; d5=0; if NT=DT.
d4=0; d5=1; if NT=DT+1.
d4=1; d5=1; in all other cases.

Bits d4 to d6 are applied to the input of a multiplexer MX14 which addresses the other memory of the driver M8 which is a channel state adder memory. Bits d0 to d3 are applied to a first group of inputs of a multipler MX15 which includes a second group of inputs connected to the outputs C8 to C11 of the counter CR7 of the sequencer SQ via the link NT, the appropriate group of inputs being selected in a manner which is explained below.

A buffer register RE17 is connected to the output of the multiplexer MX15 by a first group of inputs and via an AND gate P96 which itself is enabled by the complement of the sequence signal s5 supplied by an inverter I20 connected to the output of the decoder DEC4. It stores a frame number supplied by the counter CR7 or by the frame state memory M7.

The channel state and addition memory M8 which is suitable for storing one thousand seven-bit words serves firstly to analyse frame sychronisation for the driver AUT and secondly to perform addition for the adder AD. To do this, it is addressed by the multiplexer MX14 driven by the sequencer signal s5 supplied by the decoder DEC4. It is to be recalled that multiframe synchronisation VMT is a byte whose bits 0 to 3 have value zero, and that synchronisation recovery after loss of synchronisation implies the detection of a byte having at least one bit of value one (CCITT recommendation G732). These two criteria are taken into account by a decoder DEC6 connected by a link NB to the output of the register RE13 of the circuit CSP. The decoder supplies a zero value signal characteristic of the presence of multiframe synchronisation on one of its outputs X1 or X2 while the first or the second nibble of the byte which it receives is of value zero. The four bits f1 to f4 of the words in the channel state memory M8 translate the normal state for which the multiframe synchronisation signal VMT has been detected, either into a state corresponding to a first loss of synchronisation, or into a state corresponding to seeking synchronisation following a second loss of synchronisation in succession.

The bit f0 of the word in the channel state memory M8 corresponds to the case where the multiframe synchronisation signal VMT is present in the channel being mixed, it is applied to the select input of the multiplexer MX15, to one input of an AND gate 86 inserted upstream from the register RE16 and controled by the phase shifted clock signal WR and the bit C0 of the counter CR7.

The bit f5 corresponds to a load instruction for the multiframe shift circuit CDM. It is applied for this purpose to a bistable B18. The bit f6 corresponds to an interrupt request IN6 to the interrupt handler circuit PIC2 of the microprocessor mP2. For this purpose it is aplied to a bistable B19.

Bits f0 to f4 appear at the output of the memory M8 and are loaded into the register RE16 via the above-defined gate 86 in order to be applied to the multiplexer MX12 which addresses the mixer memory MT in order to perform addition.

Bits f1 to f4 are applied to a register RE17 via an AND gate P95 controlled by the complement of the signal s5 supplied the decoder DEC4 of the sequencer SQ.

As has been shown above, the channel state memory M8 is addressed by the multiplexer MX14 in connection with the output X2 of the decoder DEC6 and the sequence bit output from the decoder DCE4.

The multiplexer MX14 supplies eight address bits which are applied thereto via a first group of inputs connected to four bit outputs a6 to a9 of the control memory MC and to four shift bit outputs from the multiframe shift circuit CDM for the purpose of addition, or else by a second group of inputs connected to the three bit outputs d4 to d6 of the memory M7, to the output X1 of the decoder DEC6 and to the four bit outputs f1 to f4 of the multiframe shift circuit CDM for analysis purposes. The appropriate group of inputs to the multiplexer MX14 is selected by the sequencer signal s5.

The multiframe shift circuit CDM is essentially constituted by a memory M9 for storing channel states and shifts and by access means thereto. The memory M9 stores eight bit words each of which is associated with a channel of the current frame. Each word is composed of two four bit fields which respectively indicate the state of the channel as supplied by the channel state memory M8 and the shift DT as supplied by the counter CR7 or by the shift memory M7, via the register RE17 in each case.

Access to the memory M9 is controlled by an AND gate P88 whose inputs are respectively connected to two OR gates P87 and P89. The gate 87 has one input connected to the output from the register RE17 in the driver AUT and another input connected to the data bus BD2 via an AND P91 under the control of the write signal EC. The gate P89 is connected firstly to the output of the AND gate P90 which is connected the C2 bit output from the counter CR7 via an inverter I19 and to the write signal output EC, and also to an AND gate P94 which has one input connected to the sequence bit output s7 from the decoder DEC4 and which also receives the complemented clock signal W.

The shift memory M9 is addressed via a multiplexer MX16 under the control of an OR gate P98 whose inputs are respectively connected to the bit outputs s5 and s7 from the decoder DEC4 and by the C2 bit output from the counter CR7. The address inputs to the multiplexer MX16 constitute four groups E1 to E4 which respectively receive:

address bits Ai and read signal bits LEC coming from the microprocessor mP2 via the decoder DEC5 when the bit C2 is at value zero, for two groups which receive different address bits Ai;

addressing by means of bits a1 to a5 of the control memory MC and a strap-enabled signal on two inputs when the bit C2 has the value zero and when bits s5 and S7 have the value zero; and addressing by means of bits C3 to C7 of the counter CR7 and an enable signal via an OR gate P97 which receives the output bit s7 from the decoder DEC4 as complemented by an inverter I21 or the bit f5 for controlling loading into the channel state memory M8 as supplied by the bistable B18 when the bit C2 has the value zero and one of the bits s5 and s7 has the value one.

During the first part of a cycle for which the bit C2 takes the value zero, the mixer and separator BR operates as follows:

the control memory MC and the shift memory M9 are addressed by the microprocessor mP2 which checks their condition, and updates the control memory, and if necessary deals deals with any interrupt requests IN6;

the mixing memory MT is loaded with the byte contained in the input register RD8, the two nibbles composing this byte being loaded into the register RE13 when the bit s1 is at one and successively supply the mixer memory when the bit s2 and then the bit s3 take the value one.

During the second part of the cycle:

multiframe synchronisation is analysed when bit s5 is at level one, and the register RE17 and also the bistables B18 and B19 where necessary are loaded;

the more significant nibble is mixed in when the bit s6 is at one; the channel state memory M8 then operates as an adder, with the bit C1 at value zero causing a mixing instruction to be addressed for mixing the more significant nibble under the control of the control memory MC. The shift read in the memory M8 is loaded into the register RE16; the mixer memory MT is read at an address which is composed of a channel number and of the nibble number supplied respectively by bits a1 to a5 and the bit a0 at the output of the control memory MC, together with the frame number as supplied by the frame register RE16;

the nibble is loaded into register RE14;

the second or less significant nibble is mixed in when bit 57 is at one, the less significant nibble mixing instruction is addressed in the control memory MC when bit C1 is at value zero, and the same sequence of operations as described above takes place until the less significant nibble is loaded into register RE15; and the nibbles contained in registers RE14 and RE16 are loaded into a send register RD9 when bit s8 is at level one and the byte is sent over the outgoing internal link LIS.

After the register RE16 has been loaded, the shift memory M9 is loaded from the register RE17 at the address of the channel number indicated by bits C3 to C7 from the counter CR7.

Proper operation of the mixer and separator BR is monitored by the microprocessor mP2 firstly by rereading the control memory MC and the shift memory M9 and secondly by using a monitor circuit CRB (see FIG. 3) of the passive type which verifies the content of a complete multiframe before and after mixing. For this purrpose, the monitoring circuit CRB includes a memory, not shown, for storing two multiframes, one received via the incoming time links LTE1 to LTE4 and the other sent via the outgoing time links LTS1 to LTS4 which have access to the time switch CX2 of the mixer and separator unit UTB containing the mixer and separator BR.

At each clock pulse W, data picked up over these eight links is stored in such a manner as to be read by the microprocessor mP2 of the mixer and separator unit via the data bus BD2 and under the control of instructions and addresses supplied by the microprocessor mP2 via the control bus BK2 and the address bus BA2.

We claim:

1. A system for processing channel signalling in a time division digital exchange for switching at least some telephone channels including channels switched on a demand basis and tie-line channels connected on a semi-permanent basis, the exchange including: microprocessor control units; a switching network; and microprocessor terminal units; said control units and said terminal units being connected to said switching network via two-way multiplex lines enabling said terminal units to be controlled by said control units and also enabling said terminal units to communicate with one another; said terminal units including digital circuit terminal units serving respective PCM junctions via respective digital circuits and said exchange including at least one mixer and separator means coupled to said exchange for storing information defining tie line cross connections passing through the exchange;

the improvement wherein said system for processing signalling comprises means for serving communications channels both on a demand basis and on a tie line basis, said means being incorporated both in said digital circuit terminal units and in said mixer and separator means and comprising for each of said digital circuits:

a digital terminal to perform transcoding and frame realignment;

a signalling receiver circuit for receiving channel by channel signalling from said PCM junction connected to said digital circuit and for forwarding to said mixer and separator means at least the tie line signalling relating to channels in said PCM junction which are used on a tie line basis; and a signalling and alignment circuit serving firstly to monitor in parallel the alignment of the multiframes coming from the PCM junction connected to said digital circuit and from the mixer and separator means receiving said tie line signalling, and secondly for transmitting said tie line signalling to the PCM junction served by said digital circuit.

2. A system for processing channel signalling in a time division digital exchange for switching at least some telephone channels including channels switched on a demand basis and tie-line channels connected on a semi-permanent basis, the exchange including: microprocessor control units; a switching network; and microprocessor terminal units; said control units and said terminal units being connected to said switching network via two-way multiplex lines enabling said terminal units to be controlled by said control units and also enabling said terminal units to communicate with one another; said terminal units including digital circuit terminal units serving respective PCM junctions via respective digital circuits and said exchange including at least one mixer and separator means for storing information defining tie line cross connections passing through the exchange;

the improvement wherein said system for processing signalling comprises means for serving communications channels both on a demand basis and on a tie line basis, said means being incorporated both in said digital circuit terminal units and in said mixer and separator means and comprising for each of said digital circuits:

a digital terminal to perform transcoding and frame realignment;

a signalling receiver circuit for receiving channel by channel signalling from said PCM junction connected to said digital circuit and for forwarding to said mixer and separator means at least the tie line signalling relating to channels in said PCM junction which are used on a tie line basis; and a signalling and alignment circuit serving firstly to monitor in parallel the alignment of the multiframes coming from the PCM junction connected to said digital circuit and from the mixer and separator means receiving said tie line signalling, and secondly for transmitting said tie line signalling to the PCM junction served by said digital circuit, wherein said mixer and separator means is constituted by at least one mixer and separator terminal unit receiving the signalling channels associated with the tie line channels coming from PCM junctions connected to the exchange and forwarding via said switching network said tie line channel signalling to appropriate digital circuit terminal units for retransmission over their respective associated PCM junctions.

3. A system for processing channel signalling in a time division digital exchange for switching at least some telephone channels including channels switched on a demand basis and tie-line channels connected on a semi-permanent basis, the exchange including: microprocessor control units; a switching network; and microprocessor terminal units; said control units and said terminal units being connected to said switching network via two-way multiplex lines enabling said terminal units to be controlled by said control units and also enabling said terminal units to communicate with one another; each said terminal unit comprising a time switch connecting the unit to the switching network of the exchange via two-way multiplex links, said terminal units including digital circuit terminal units serving respective PCM junctions via respective digital circuits and said exchange including at least one mixer and separator means for storing information defining tie line cross connections passing through the exchange;

the improvement wherein said system for processing signalling comprises means for serving communications channels both on a demand basis and on a tie line basis, said means being incorporated both in said digital circuit terminal units and in said mixer and separator means and comprising for each of said digital circuits:

a digital terminal to perform transcoding and frame realignment;

a signalling receiver circuit for receiving channel by channel signalling from said PCM junction connected to said digital circuit and for forwarding to said mixer and separator means at least the tie line signalling relating to channels in said PCM junction which are used on a tie line basis; and a signalling and alignment circuit serving firstly to monitor in parallel the alignment of the multiframes coming from the PCM junction connected to said digital circuit and from the mixer and separator means receiving said tie line signalling, and secondly for transmitting said tie line signalling to the PCM junction served by said digital circuit;

wherein each digital circuit terminal unit includes inlet multiplex links and outlet multiplex links connecting the time switch of the digital terminal unit to the signalling receiver circuit, to the signalling alignment circuit and to a transceiver of the unit's microprocessor, the time switch establishing connections of these circuits between one another and with the multiplex links connected to the switching network for the purposes of signalling and under the control of the microprocessor.

4. A system according to claim 2, wherein the mixer and separator terminal unit comprises a time switch connecting the unit to the switching network via two-way multiplex links, and a mixer and separator connected to the time switch via an internal inlet multiplex link and an internal outlet multiplex link for mixing the signalling channels corresponding to tie lines which it receives from the sending terminal units via the switching network and the inlet multiplex link and for retransmitting them after mixing to receiving terminal units via the internal outlet multiplex link and the switching network.

5. A system according to claim 3, wherein the synchronising and alignment circuit comprises means for analysing multiframe alignment enabling successive multiframes to be scanned for two modes of channel service, said means being essentially constituted by:

a signalling shift register connected downstream from an inlet multiplex link transmitting signalling bytes received from the mixer and separator means and from the PCM junction served by the digital circuit in which it is included;

a synchronising ROM whose address inputs are connected to parallel outputs from two state registers which are respectively attributed to signals coming from the associated PCM junction and to signals coming the mixer and separator means, said registers being respectively connected in parallel to the output of the synchronising memory; and a series of data bistables having their inputs connected to the output of the synchronising memory and having their outputs connected to the microprocessor of the terminal unit in which they are included.

6. A system according to claim 3, wherein the synchronising and alignment circuit comprises a signalling send circuit constituted by a RAM for sending instructions connected via its outputs to a down counter and to a register whose outputs are looped back to the data inputs of the send memory, which is also connected via its inputs to the microprocessor and to a receive register connected upstream from an inlet multiplex link for receiving data sent from the mixer and separator unit, the register being connected via its outputs to the microprocessor and to a send register connected via an outlet multiplex link to the time switch of the terminal unit in which they are included.

7. A system according to claim 3, wherein the mixer and separator comprises a control memory containing mixing instructions provided by the microprocessor of the mixer and separator unit in which it is included, a driver for detecting a multiframe synchronising signal on each channel transmitted by the incoming multiplex link, a circuit for storing frame shifts between a multiframe synchronising signal and a reference signal, an adder having one input connected to receive the shift and another input connected to receive a frame number read from the control memory, a mixing memory associated with a series-to-parallel converter circuit at its input and a parallel-to-series converter circuit at its output between the inlet multiplex link and the outlet multiplex link, said mixer memory being read addressed by a sequencer and being write addressed by the control memory and by the adder.

8. A system according to claim 6, wherein access to the mixer memory is performed by nibbles via two AND gates, and wherein an injection circuit inserted upstream from the parallel-to-series converter ensures that a multiframe is built up on the outlet multiplex link from nibbles read in the mixer memory on instructions from the control memory concerning the codes to be sent and the state of the channels which are applied to a read only memory whose output is fed to the parallel-to-series converter.

9. A system according to claim 3, wherein a tie line incoming to the exchange on one digital circuit is switched through the exchange to leave via a different digital circuit under the control of at least one control unit, said switching requiring:

the signalling channel associated with the tie line received over a PCM junction to be switched by the time switch associated with the digital circuit serving said junction in the terminal unit including said digital circuit, said switching being towards one of the channels in the multiplex links connecting the switch to the switching network;

two semi-permanent connections are established through the switching network, one for the tie line itself, and the other for the associated signalling channel transmitted via the multiplex link mentioned above, said other semi-permanent connection ensuring the transfer of signalling to the mixer and separator unit via a multiplex link; and the establishment of a path similar to that described above between the mixer and separator unit and the digital circuit to which the destination PCM junction is connected.

* * * * *